(12) United States Patent
Miyashita

(10) Patent No.: US 11,136,927 B2
(45) Date of Patent: Oct. 5, 2021

(54) INTERNAL COMBUSTION ENGINE SYSTEM

(71) Applicant: TOYOTA JIDOSHA KABUSHIKI KAISHA, Toyota (JP)

(72) Inventor: Shigeki Miyashita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 16/820,763

(22) Filed: Mar. 17, 2020

(65) Prior Publication Data
US 2020/0318559 A1    Oct. 8, 2020

(30) Foreign Application Priority Data
Apr. 3, 2019 (JP) .............................. JP2019-071560

(51) Int. Cl.
| | | |
|---|---|---|
| F01L 1/34 | (2006.01) | |
| F02D 41/12 | (2006.01) | |
| F02D 41/00 | (2006.01) | |
| F02D 13/02 | (2006.01) | |
| F02B 75/12 | (2006.01) | |

(52) U.S. Cl.
CPC ............ F02D 41/0002 (2013.01); F01L 1/34 (2013.01); F02D 13/0215 (2013.01); F02D 13/0219 (2013.01); F02D 41/006 (2013.01); F02D 41/126 (2013.01); F01L 2201/00 (2013.01); F01L 2800/00 (2013.01); F02B 2075/125 (2013.01); F02D 2013/0292 (2013.01); F02D 2041/001 (2013.01); F02D 2041/002 (2013.01); F02D 2200/0406 (2013.01)

(58) Field of Classification Search
CPC .... F01L 1/34; F02D 13/0215; F02D 13/0219; F02D 41/005; F02D 41/123; F02D 41/126; F02D 2041/001
USPC ........................... 123/90.15–90.18, 321, 325
See application file for complete search history.

(56) References Cited

U.S. PATENT DOCUMENTS

| | | | | |
|---|---|---|---|---|
| 5,558,051 A | * | 9/1996 | Yoshioka | ............... F02D 41/123 123/90.15 |
| 6,161,521 A | * | 12/2000 | Russ | .................... F02D 13/0219 123/324 |
| 6,656,089 B2 | * | 12/2003 | Furukawa | ............... F02D 41/22 477/111 |

(Continued)

FOREIGN PATENT DOCUMENTS

JP            2013-227909 A       11/2013

*Primary Examiner* — Erick R Solis
(74) *Attorney, Agent, or Firm* — Oblon, McClelland, Maier & Neustadt, L.L.P.

(57) ABSTRACT

An internal combustion engine system includes an internal combustion engine and a control device. A difference of an intake valve closing timing with respect to a compression top dead center is referred to as a first crank angle difference; a difference of an exhaust valve closing timing with respect to an exhaust top dead center is referred to as a second crank angle difference; and a difference between the first crank angle difference and the second crank angle difference is referred to as an intake/exhaust closing timing difference. The control device is configured to execute: a fuel cut processing; and a valve driving processing to control at least one of the intake valve closing timing and the exhaust valve closing timing such that the intake/exhaust closing timing difference becomes smaller during a fuel cut operation than during a non-fuel cut operation.

12 Claims, 12 Drawing Sheets

During Non-Fuel Cut Operation

During Fuel Cut Operation

(56) References Cited

U.S. PATENT DOCUMENTS

| | | | | |
|---|---|---|---|---|
| 7,051,704 B2* | 5/2006 | Kawamura | ......... | F02D 41/0005 |
| | | | | 123/322 |
| 7,201,143 B2* | 4/2007 | Muto | ................. | F02D 41/0005 |
| | | | | 123/399 |
| 8,386,151 B2* | 2/2013 | Hattori | .................... | B60K 6/24 |
| | | | | 701/105 |
| 8,918,267 B2* | 12/2014 | Nakagawa | .............. | F02D 13/08 |
| | | | | 701/103 |
| 9,719,430 B2* | 8/2017 | Ueda | .................. | F02D 41/0005 |

* cited by examiner

During Non-Fuel Cut Operation

During Fuel Cut Operation (Late Stage of Compresssion Stroke)

FIG. 17A <Start F/C>
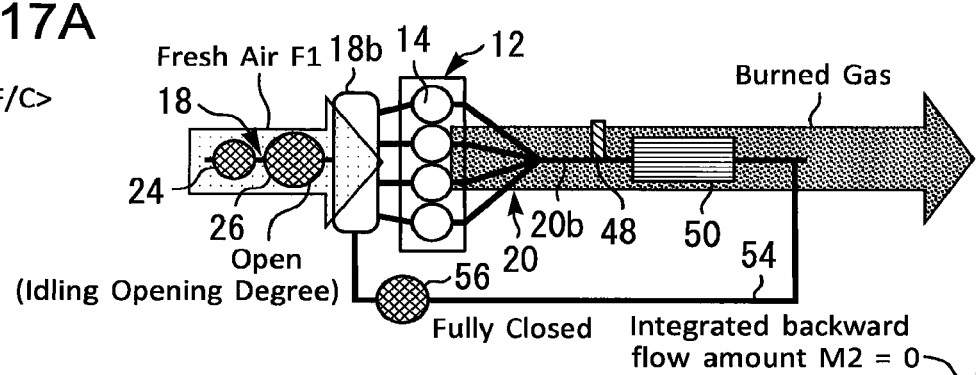
FIG. 17B <Arrival of fresh air to catalyst due to control delay>
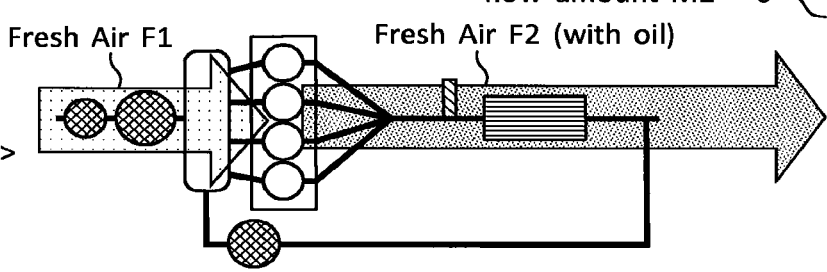
FIG. 17C <Start to generate backward flow>
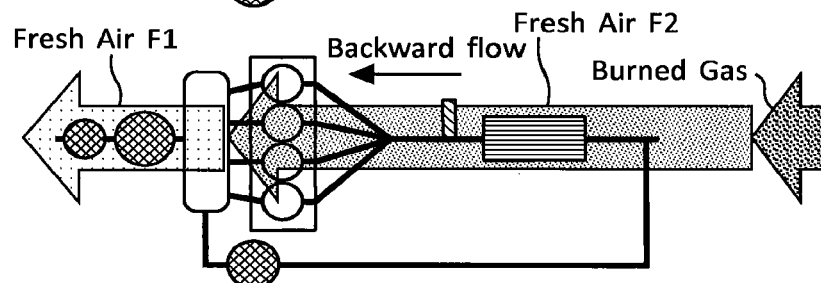
FIG. 17D <Execute EGR opening processing and throttle closing processing>
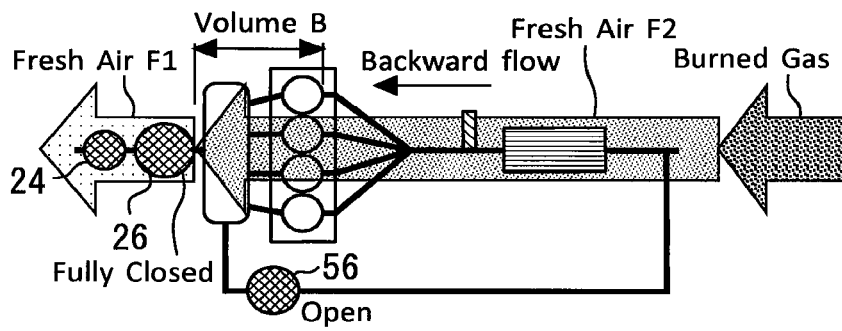
FIG. 17E <Stop feedback processing>
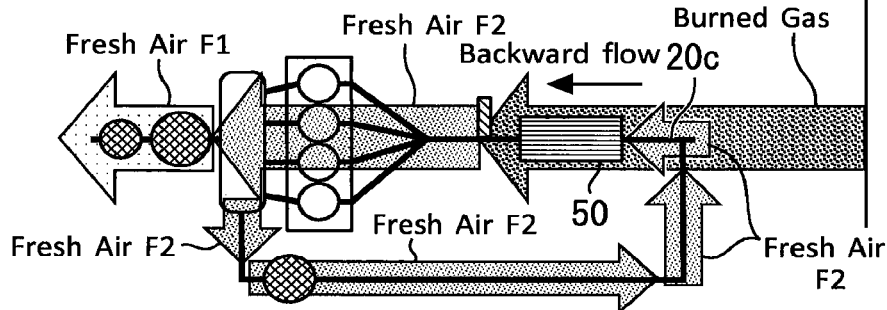

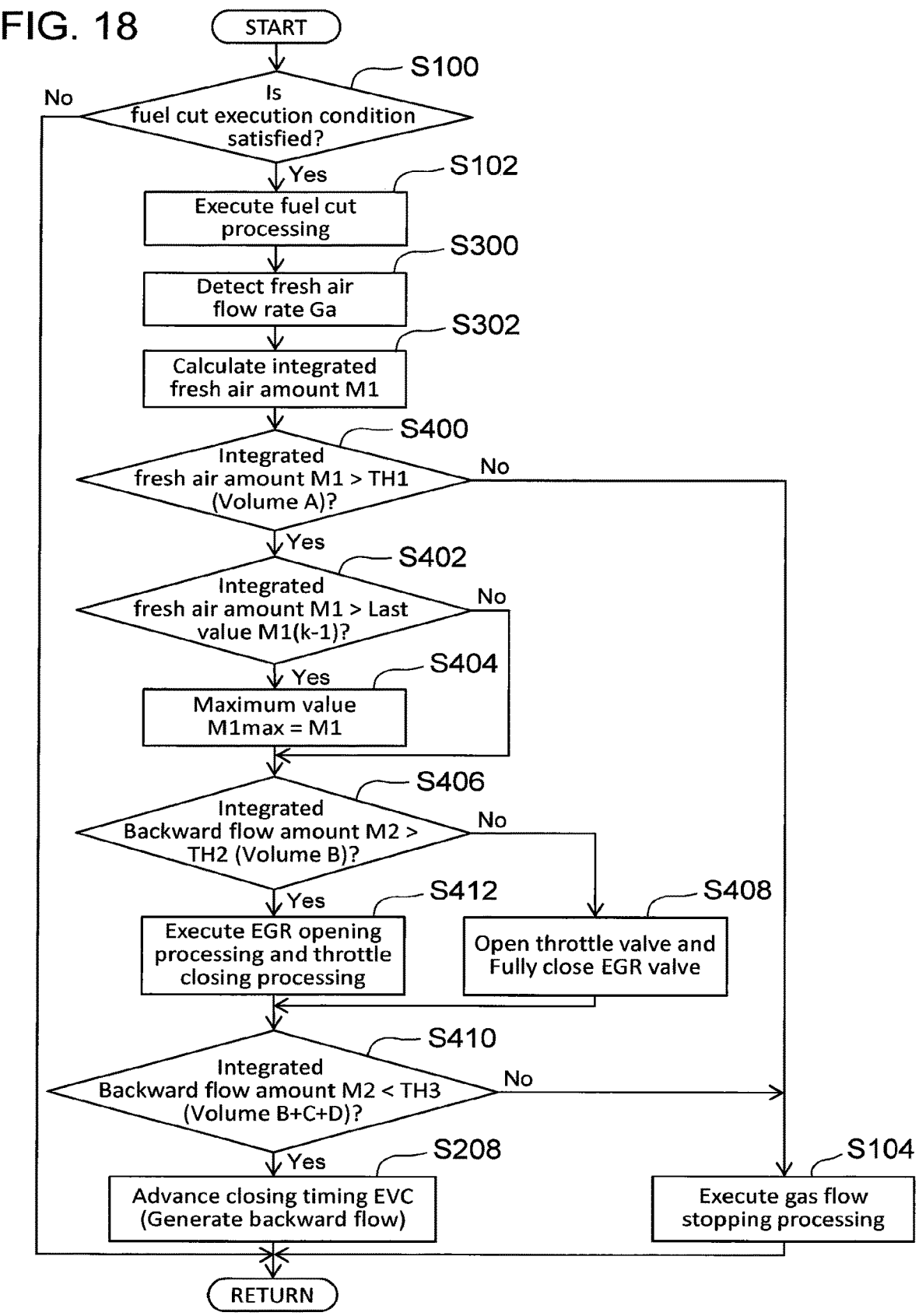

INTERNAL COMBUSTION ENGINE SYSTEM

CROSS-REFERENCE TO RELATED APPLICATION

The present disclosure claims priority under 35 U.S.C. § 119 to Japanese Patent Application No. 2019-071560, filed Apr. 3, 2019. The content of which is incorporated herein by reference in its entirety.

BACKGROUND

Technical Field

The present disclosure relates to an internal combustion engine system, and more particularly to a system of an internal combustion engine including a variable valve operating device configured to change at least one of an intake valve closing timing and an exhaust valve closing timing.

Background Art

For example, JP 2013-227909 A discloses a control device for an internal combustion engine. This internal combustion engine is provided with first and second intake valves that opens and closes first and second intake ports, and a variable valve operating device configured to individually control the valve timing of the first and second intake valves. The internal combustion engine is also provided with a port valve that opens and closes a portion of the second intake port located on the upstream side of the second intake valve, an EGR passage connected to a portion of the second intake port located between the port valve and the second intake valve, and an EGR valve that opens and closes this EGR passage. The internal combustion engine is further provided with an exhaust valve that opens and closes an exhaust port, and an exhaust gas purifying catalyst disposed in a portion of an exhaust gas passage located on the downstream side of the exhaust port.

Where the intake pressure is higher than the exhaust pressure during a valve overlap period in which the exhaust valve and the second intake valve are both open, the control device executes the following control in order to reduce the deterioration of the exhaust gas purifying catalyst caused by the fresh air blowing through a combustion chamber and reaching the exhaust gas purifying catalyst during the valve overlap period. That is to say, the control device opens the EGR valve and closes the port valve. Furthermore, the control device controls the variable valve operating device such that the second intake valve is opened and closed when the exhaust valve is open, and such that the first intake valve is opened after the exhaust valve is closed.

SUMMARY

When a fuel cut operation is executed during the rotation of a crankshaft of the internal combustion engine, fresh air taken into an intake air passage flows into an exhaust gas purifying catalyst. As a result, there is a concern that deterioration of the exhaust gas purifying catalyst or an excessive increase in the oxygen storage amount of the exhaust gas purifying catalyst may occur.

As a result of earnest study, the inventor of the present disclosure has found a method of controlling the inflow of fresh air into the exhaust gas purifying catalyst during the fuel cut operation by using control of at least one of an intake valve closing timing and an exhaust valve closing timing.

The present disclosure has been made in view of the problem described above, and an object of the present disclosure is to provide an internal combustion engine system that can reduce the inflow of fresh air into an exhaust gas purifying catalyst during a fuel cut operation by using control of at least one of an intake valve closing timing and an exhaust valve closing timing.

An internal combustion engine system according to the present disclosure includes: an internal combustion engine including a crankshaft, an exhaust gas purifying catalyst arranged in an exhaust gas passage, a fuel injection valve configured to inject fuel in an intake port of an intake air passage or in a cylinder, and a variable valve operating device configured to change at least one of an intake valve closing timing and an exhaust valve closing timing; and a control device configured to control the internal combustion engine. Where: a difference of the intake valve closing timing with respect to a compression top dead center is referred to as a first crank angle difference; a difference of the exhaust valve closing timing with respect to an exhaust top dead center is referred to as a second crank angle difference; and a difference between the first crank angle difference and the second crank angle difference is referred to as an intake/exhaust closing timing difference, the control device is configured to execute: a fuel cut processing that controls the fuel injection valve to stop fuel injection during rotation of the crank shaft; and a valve driving processing that controls the variable valve operating device to control at least one of the intake valve closing timing and the exhaust valve closing timing such that the intake/exhaust closing timing difference becomes smaller during a fuel cut operation in which the fuel cut processing is in execution than during a non-fuel cut operation.

The valve driving processing may include a gas flow stopping processing that controls the variable valve operating device to control at least one of the intake valve closing timing and the exhaust valve closing timing such that the intake/exhaust closing timing difference approaches zero.

In the gas flow stopping processing, the control device may be configured to change the intake/exhaust closing timing difference, in accordance with engine speed, within a designated crank angle range centered on a basic value at which the intake/exhaust closing timing difference is zero.

The variable valve operating device may be configured to change only the intake valve closing timing among the intake valve closing timing and the exhaust valve closing timing. In the gas flow stopping processing, the control device may also be configured to retard the intake valve closing timing to cause the intake/exhaust closing timing difference to approach zero.

The variable valve operating device may be configured to change only the exhaust valve closing timing among the intake valve closing timing and the exhaust valve closing timing. In the gas flow stopping processing, the control device may also be configured to advance the exhaust valve closing timing to cause the intake/exhaust closing timing difference to approach zero.

The internal combustion engine may further include an air fuel ratio sensor arranged in a portion of the exhaust gas passage located on an upstream side of the exhaust gas purifying catalyst. The valve driving processing may include a first feedback processing. In the first feedback processing, the control device may also be configured, where an actual air fuel ratio detected by the air fuel ratio sensor is higher than an air fuel ratio threshold value higher than a target air fuel ratio at an engine operating condition immediately before a start of the fuel cut processing, to control at least one of the intake valve closing timing and the exhaust valve closing timing such that a backward flow being a flow of gas from the exhaust gas passage toward the intake air passage through the cylinder is generated or such that a flow rate of a forward flow being a flow of fresh air from the intake air passage toward the exhaust gas passage through the cylinder decreases.

In the first feedback processing, the control device may be configured, where the actual air fuel ratio is equal to or lower than the air fuel ratio threshold value, to control at least one of the intake valve closing timing and the exhaust valve closing timing such that the backward flow is stopped or the forward flow is generated.

The valve driving processing may include a second feedback processing. The internal combustion engine may also include at least one of an air flow sensor and an intake pressure sensor, The second feedback processing may further include an integrated fresh air amount calculation processing to calculate, based on an output of the air flow sensor or the intake pressure sensor, an integrated fresh air amount being an integrated value of fresh air from the intake air passage toward the exhaust gas passage through the cylinder after the fuel cut processing starts. In the second feedback processing, the control device may be further configured, where the integrated fresh air amount is greater than a fresh air amount threshold value equal to or less than a volume A of a catalyst upstream portion being a portion of the exhaust gas passage located on an upstream side of the exhaust gas purifying catalyst, to control at least one of the intake valve closing timing and the exhaust valve closing timing such that a backward flow being a flow of gas from the exhaust gas passage toward the intake air passage through the cylinder is generated or such that a flow rate of a forward flow being a flow of fresh air from the intake air passage toward the exhaust gas passage through the cylinder decreases.

In the second feedback processing, the control device may be configured, where the integrated fresh air amount is equal to or less than the fresh air amount threshold value, to control at least one of the intake valve closing timing and the exhaust valve closing timing such that the backward flow is stopped or the forward flow is generated.

The internal combustion engine may further include an EGR device. The EGR device may include an EGR passage configured to connect a portion of the exhaust gas passage located on a downstream side of the exhaust gas purifying catalyst with the intake air passage, and an EGR valve configured to open and close the EGR passage. The second feedback processing may also include an EGR opening processing executed during generation of the backward flow by the second feedback processing. In the EGR opening processing, the control device may be further configured, after an integrated backward flow amount being an integrated value of a backward flow amount of fresh air in generating the backward flow by the second feedback processing becomes higher than an amount of fresh air contained in a volume B equal to or greater than a combustion chamber volume in the cylinder, to open the EGR valve.

The internal combustion engine may further include a throttle valve arranged in a portion of the intake air passage located on an upstream side of a connecting position of the EGR passage with respect to the intake air passage. The second feedback processing may also include a throttle closing processing that closes the throttle valve after the integrated backward flow amount becomes greater than the amount of fresh air contained in the volume B.

Where a volume of the EGR passage is referred to as a volume C and a volume of a catalyst downstream portion of the exhaust gas passage located between a connecting position of the EGR passage with respect to the exhaust gas passage and an outlet of the exhaust gas purifying catalyst is referred to as a volume D, the control device may be configured, after the integrated backward flow amount becomes equal to or greater than an amount of fresh air contained in a volume equivalent to a sum of the volume B, the volume C and the volume D.

According to the internal combustion engine system of the present disclosure, during the fuel cut operation, the intake/exhaust closing timing difference is reduced by executing the valve driving processing as compared to during the non-fuel cut operation. This reduction in the intake/exhaust closing timing difference leads to a reduction in the gas amount difference between the amount of fresh air (fresh air charge amount) existing in the cylinder at the intake valve closing timing and the amount of gas (residual gas amount) remaining in the cylinder at the exhaust valve closing timing. Furthermore, the reduction in this gas amount differences leads to a decrease in the flow rate of fresh air from the intake air passage toward the exhaust gas passage through the cylinder. Therefore, by executing the valve driving processing, the inflow of fresh air to the catalyst can be reduced during the fuel cut operation.

BRIEF DESCRIPTION OF THE DRAWINGS

FIG. 17A is a diagram used to conceptually explain an example of an operation by processing during a fuel cut operation according to a seventh embodiment of the present disclosure;

FIG. 17B is a diagram used to conceptually explain the example of the operation by processing during the fuel cut operation according to the seventh embodiment of the present disclosure;

FIG. 17C is a diagram used to conceptually explain the example of the operation by processing during the fuel cut operation according to the seventh embodiment of the present disclosure;

FIG. 17D is a diagram used to conceptually explain the example of the operation by processing during the fuel cut operation according to the seventh embodiment of the present disclosure;

FIG. 17E is a diagram used to conceptually explain the example of the operation by processing during the fuel cut operation according to the seventh embodiment of the present disclosure; and FIG. 18 is a flowchart that shows a routine of processing concerning an engine control according to the seventh embodiment of the present disclosure.

DETAILED DESCRIPTION

Figure 1:
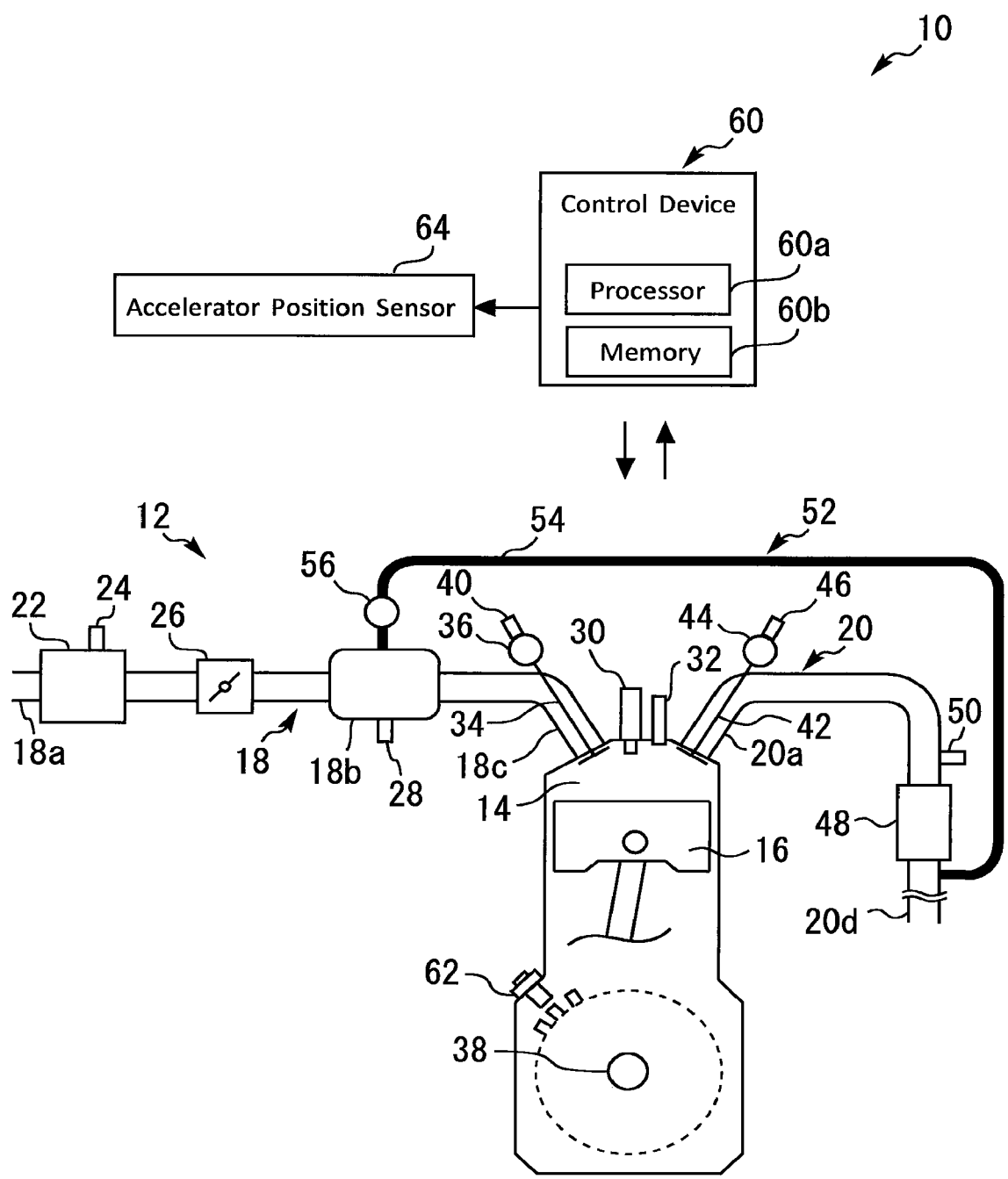
FIG. 1 is a schematic diagram used to explain a configuration example of an internal combustion engine system according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

An internal combustion engine system 10 according to a first embodiment of the present disclosure and modification examples thereof will be described with reference to FIGS. 1 to 6.

1-1. Configuration Example of Internal Combustion Engine System

FIG. 1 is a schematic diagram used to explain a configuration example of the internal combustion engine system 10 according to the first embodiment of the present disclosure. The internal combustion engine system 10 shown in FIG. 1 includes an internal combustion engine 12 which is a four-stroke reciprocating engine. The internal combustion engine 12 is, as an example, a spark ignition type internal combustion engine (for example, a gasoline engine) and is mounted on a vehicle and used as a power source thereof. It should be noted that, although the internal combustion engine 12 is an in-line four-cylinder engine as an example, the number and arrangement of cylinders of the internal combustion engine 12 are not particularly limited. Also, the internal combustion engine included in an internal combustion engine system according to the present disclosure may be a compression ignition type instead of the spark ignition type.

A piston 16 is disposed in each of cylinders 14 of the internal combustion engine 12. The piston 16 reciprocates inside the corresponding cylinder 14. An intake air passage 18 and an exhaust gas passage 20 communicate with each of the cylinders 14 (more specifically, each of combustion chambers). An air cleaner 22 is arranged in the vicinity of an inlet (intake air inlet hole 18a) of the intake air passage 18. An air flow sensor 24 is attached to the air cleaner 16. The air flow sensor 24 outputs a signal responsive to the flow rate of the air taken into the intake air passage 18 (i.e., fresh air flow rate Ga).

An electronically controlled throttle valve 26 is disposed in a portion of the intake air passage 18 located on the downstream side of the air flow sensor 24. An intake pressure sensor 28 is disposed in a collective portion (surge tank 18b) of an intake manifold located downstream of the throttle valve 26. The intake pressure sensor 28 outputs a signal responsive to the pressure (surge tank pressure) at a portion of the intake air passage 18 located downstream of the throttle valve 26.

The internal combustion engine 12 is also provided with fuel injection valves 30 and an ignition device 32. The fuel injection valve 30 is disposed in each of the cylinders 14, and directly injects fuel into the corresponding cylinder 14 (more specifically, into the corresponding combustion chamber). It should be noted that, instead of or in addition to the fuel injection valves 30, fuel injection valves that inject fuel into the respective intake ports 18c of the intake air passage 18 may be provided.

Each of the intake ports 18c is opened and closed by an intake valve 34. The intake valves 34 are driven by an intake variable valve operating device 36. The intake variable valve operating device 36 is, as an example, a variable valve timing device configured to change the rotational phase of an intake camshaft (not shown) with respect to the rotational phase of a crankshaft 38, and is hereinafter also referred to as an "intake VVT 36". The intake VVT 36 is of an electric type as an example. According to the intake VVT 36, it is possible to continuously change the opening and closing timings (i.e., the phase of the valve opening period) of the intake valve 34 within a predetermined control range while fixing the operating angle (i.e., the valve opening period (more specifically, the crank angle width in which the intake valve 34 is open)) of the intake valve 34. According to the electrically driven intake VVT 36, it is possible to change the opening and closing timings of the intake valves 34 with a high degree of freedom. However, as the intake VVT 36, a variable valve operating device of another type, such as a hydraulic type, may be used. Around the intake camshaft, an intake cam angle sensor 40 that outputs a signal responsive to the rotational phase of the intake camshaft (i.e., intake cam angle) is disposed.

Each of exhaust ports 20*a* of the exhaust gas passage 20 is opened and closed by an exhaust valve 42. The exhaust valves 42 are driven by an exhaust variable valve operating device 44. The exhaust variable valve operating device 44 is also a variable valve timing device as an example, similar to the intake VVT 36, and is hereinafter also referred to as an "exhaust VVT 44". Around an exhaust cam shaft (not shown), an exhaust cam angle sensor 46 that outputs a signal responsive to the rotational phase of the exhaust cam shaft (i.e., exhaust cam angle) is disposed. It should be noted that the intake VVT 36 and the exhaust VVT 44 correspond to examples of the "variable valve operating devices" according to the present disclosure, respectively.

A plurality of exhaust gas purifying catalysts including an exhaust gas purifying catalyst (i.e., start catalyst) 48 are disposed in the exhaust gas passage 20. The exhaust gas purifying catalyst 48 (hereinafter, simply abbreviated as a "catalyst 48") is disposed on the most upstream side in the exhaust gas flow among the plurality of exhaust gas purifying catalysts. In FIG. 1, only this catalyst 48 is shown. An air fuel ratio sensor 50 is installed in a portion of the exhaust gas passage 20 located on the upstream side of the catalyst 48. The air fuel ratio sensor 50 outputs a signal responsive to the air fuel ratio of the exhaust gas (actual air fuel ratio AF) from each of the cylinders 14. The exhaust gas passing through the exhaust gas passage 20 is discharged into the atmosphere through an outlet of the exhaust gas passage 20 (i.e., an opening of a tail pipe 20*d*).

The internal combustion engine 12 is further provided with an EGR device 52. The EGR device 52 includes at least an EGR passage 54 and an EGR valve 56. The EGR passage 54 connects a portion of the exhaust gas passage 20 located on the downstream side of the catalyst 48 with the intake air passage 18. In more detail, as an example, the EGR passage 54 is connected to a portion of the intake air passage 18 located on the downstream side of the throttle valve 26 (i.e., the surge tank 18*b*). The EGR valve 56 opens and closes the EGR passage 54. The EGR valve 56 is basically opened and closed to adjust the amount of EGR gas introduced into the intake air passage 18 through the EGR passage 54.

The internal combustion engine system 10 according to the present embodiment further includes a control device 60 configured to control the internal combustion engine 12. The control device 60 includes an electronic control unit (ECU) having at least one processor 60*a* and at least one memory 60*b*. The memory 60*b* stores various data including maps used for engine control and various control programs. The processor 60*a* reads out a control program from the memory 60*b* and executes the control program, and, as a result, the processing by the control device 60 is achieved. It should be noted that the control device 60 may be configured using a plurality of ECUs.

The control device 60 receives sensor signals from various sensors. This kind of sensors include at least a crank angle sensor 62 and an accelerator position sensor 64, for example, in addition to the air flow sensor 24, the intake pressure sensor 28, the intake cam angle sensor 40, and the exhaust cam angle sensor 46 that are described above. The crank angle sensor 62 outputs a signal responsive to the crank angle. The control device 60 can calculate an engine speed NE based on the signals from the crank angle sensor 62. The accelerator position sensor 64 outputs a signal responsive to the amount of depression of the accelerator pedal (i.e., accelerator position) of the vehicle on which the internal combustion engine 12 is mounted. Also, the processor 60*a* executes various programs using the received sensor signals, and outputs operating signals for operating the above-described actuators (i.e., the throttle valve 26, the fuel injection valves 30, the ignition device 32, the intake VVT 36 and the exhaust VVT 44).

1-2. Control of Internal Combustion Engine System

In the present embodiment, the processing concerning the engine control by the control device 60 includes the following "fuel cut processing" and "valve driving processing".

1-2-1. Fuel Cut Processing

The control device 60 executes the fuel cut processing as long as a predetermined fuel cut execution condition is satisfied. According to the fuel cut processing, the fuel injection valves 30 for the respective cylinders 14 are controlled so as to stop the fuel injection during the rotation of the crankshaft 38.

The fuel cut processing is performed in various manners during the operation of the internal combustion engine 12. Typically, the fuel cut processing is performed at the time of deceleration of the vehicle on which the internal combustion engine 12 is mounted. To be more specific, the fuel cut processing at the time of deceleration is executed, for example, when the fuel cut execution condition that the engine speed NE is equal to or higher than a predetermined value is satisfied when depression of the accelerator pedal is released.

The fuel cut processing is executed not only when the crankshaft 38 is rotationally driven by the vehicle wheels as in the deceleration, but also in a predetermined number of cycles during an engine start-up in which cranking is performed using a starter motor (not shown), for example. Furthermore, in an example of a hybrid vehicle including one or more electric motors together with the internal combustion engine 12 as the power source, the processing to stop the fuel injection when the crankshaft 38 is rotated by using an electric motor configured to rotatably drive the internal combustion engine 12 also corresponds to another example of the "fuel cut processing" according to the present disclosure.

1-2-2. Valve Driving Processing (Gas Flow Stopping Processing) During Fuel Cut Operation When a fuel cut operation is performed during the rotation of the crankshaft, fresh air taken into an intake air passage may flow into an exhaust gas purifying catalyst. As a result, there is a concern that the deterioration of the exhaust gas purifying catalyst or an excessive increase in the oxygen storage amount of the exhaust gas purifying catalyst may occur. In view of this issue, according to the present embodiment, the valve driving processing described below is performed during the fuel cut operation in which the fuel cut processing is performed. More specifically, in the present embodiment, the valve driving processing is executed as a "gas flow stopping processing".

Figure 2:
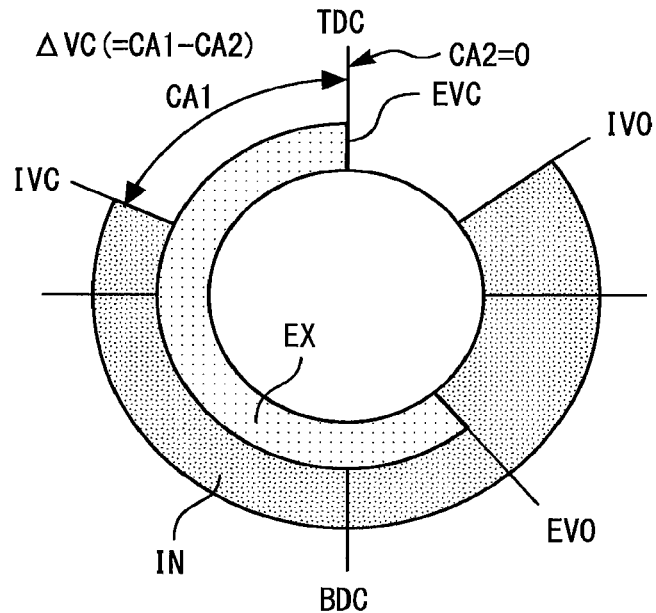
FIG. 2 is a diagram that shows an example of an intake and exhaust valve timing used during a non-fuel cut operation.

FIG. 2 is a diagram that shows an example of the intake and exhaust valve timing used during the non-fuel cut operation. During the non-fuel cut operation (i.e., during normal operation (firing operation) in which combustion is performed), the intake valves 34 are opened and closed to take fresh air into the cylinders 14 from the intake air passage 18, and the exhaust valves 42 are opened and closed to discharge burned gas from the cylinders 14 to the exhaust gas passage 20. In the example shown in FIG. 2, the intake valves 34 are opened (IVO) in the early stage of the intake stroke, and is closed (IVC) in the late stage of the compression stroke. On the other hand, the exhaust valves 42 are opened (EVO) in the late stage of the expansion stroke, and is closed (EVC) in the vicinity of the exhaust top dead center.

An "intake/exhaust closing timing difference $\Delta VC$" is herein described by taking the intake and exhaust valve timing shown in FIG. 2 as an example. In the present specification, the difference of the closing timing IVC of the intake valve 34 with respect to the compression top dead center is referred to as a "first crank angle difference CA1", and the difference of the closing timing EVC of the exhaust valve 42 with respect to the exhaust top dead center is referred to as a "second crank angle difference CA2". Then, the difference between the first crank angle difference CA1 and the second crank angle difference CA2 is referred to as the "intake/exhaust closing timing difference $\Delta VC$".

Figure 3:
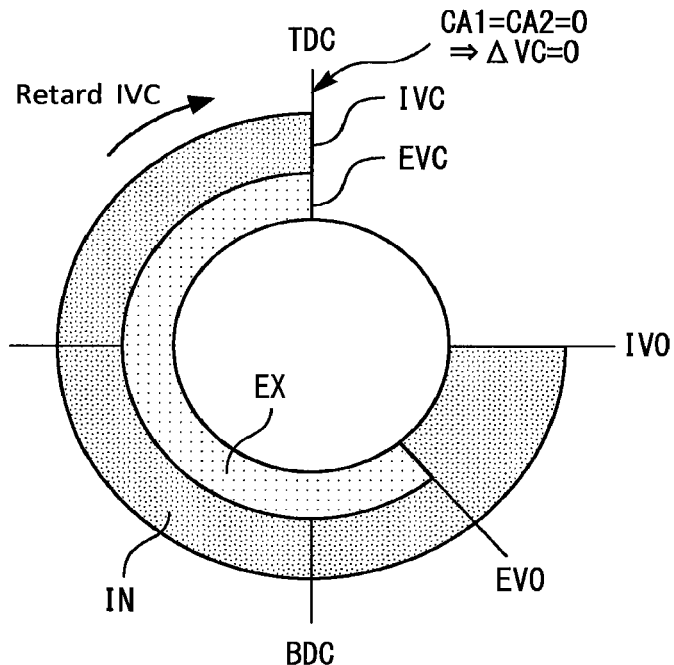
FIG. 3 is a diagram that shows an example of the intake and exhaust valve timing realized by a valve driving processing (gas flow stopping processing) according to the first embodiment of the present disclosure.

FIG. 3 is a diagram that shows an example of the intake and exhaust valve timing realized by the valve driving processing (gas flow stopping processing) according to the first embodiment of the present disclosure. According to the gas flow stopping processing of the present embodiment, as shown in FIG. 3, the closing timing EVC of the exhaust valve 42 is not changed from the position shown in FIG. 2. On the other hand, the closing timing IVC of the intake valve 34 is retarded with respect to the position shown in FIG. 2 so as to be located at the top dead center (compression top dead center) similarly to the closing timing EVC located at the top dead center (exhaust top dead center). As a result, since the first crank angle difference CA1 becomes zero similarly to the second crank angle difference CA2, the intake/exhaust closing timing difference $\Delta VC$ becomes zero. As just described, according to this gas flow stopping processing, the closing timing IVC is retarded by using the intake VVT 36 in order to cause the intake/exhaust closing timing difference $\Delta VC$ to approach zero.

The intake and exhaust valve timing diagram as shown in FIGS. 2 and 3 represent crank angle positions during one cycle of the internal combustion engine 12 (i.e., two revolutions (720°) of the crankshaft 38) using circular curves. Because of this, what the intake/exhaust closing timing difference $\Delta VC$ defined as described above is zero means that the closing timing IVC and the closing timing EVC are aligned on the diagrams of the intake and exhaust valve timing as shown in FIGS. 2 and 3.

In other words, as can be understood from comparing FIG. 2 and FIG. 3, according to the valve driving processing (gas flow stopping processing) of the present embodiment, the intake VVT 36 is controlled such that the "intake/exhaust closing timing difference $\Delta VC$" becomes smaller than that during the non-fuel-cut operation.

Figure 4:
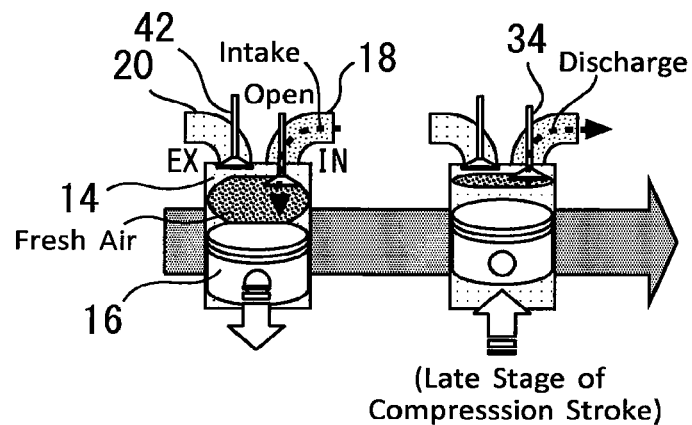
FIG. 4 is a schematic diagram used to explain an operation associated with opening and closing of intake valves in an example of setting of the valve timing shown in FIG. 3.

FIG. 4 is a schematic diagram used to explain an operation associated with the opening and closing of the intake valves 34 in the example of setting of the valve timing shown in FIG. 3. According to the valve timing shown in FIG. 3, the intake valve 34 is opened in the intake stroke in which the piston 16 is descending. As a result, as shown in FIG. 4, fresh air is sucked into the cylinders 14 from the intake air passage 18. Thereafter, the intake valves 34 are closed at the compression top dead center. Because of this, as shown in FIG. 4, the fresh air taken into the cylinders 14 in the intake stroke is discharged (returned) to the intake air passage 18 during the compression stroke. More precisely, the fresh air is returned to the intake air passage 18 except for a part thereof left in the clearance volume (i.e., combustion chamber volume).

Furthermore, according to the valve timing shown in FIG. 3, the opening and closing of the exhaust valves 42 in the subsequent expansion stroke and exhaust stroke are performed in the same manner as in the example shown in FIG. 2. As a result, the exhaust valves 42 are opened in the expansion stroke in which the piston 16 is descending, whereby the gas in the exhaust gas passage 20 is sucked into the cylinders 14. The sucked gas is discharged (returned) into the exhaust gas passage 20 again during the subsequent exhaust stroke. More strictly, the gas excluding a part thereof left in the clearance volume (combustion chamber volume) is returned to the exhaust gas passage 20. It should be noted that the gas mentioned here is basically fresh air. In more detail, this gas corresponds to the burned gas in a time period before the fresh air reaches the exhaust gas passage 20 immediately after the start of the fuel cut operation, and corresponds to fresh air in a time period after fresh air reaches the exhaust gas passage 20 after the start of the fuel cut operation.

In addition, the amount of fresh air which is sucked into the cylinders 14 when the intake valves 34 are open and which is present (i.e., is charged) in the cylinders 14 at the closing timing IVC is referred to as a "fresh air charge amount A1". Also, the amount of gas (basically, fresh air) left in the cylinders 14 at the closing timing EVC without being discharged from the cylinders 14 when the exhaust valves 42 are opened is referred to as a "residual gas amount A2".

In the example of the valve timing shown in FIG. 3 used in the gas flow stopping processing according to the present embodiment, the fresh air charging amount A1 is equal to the amount of the fresh air contained in the clearance volume, and the residual gas amount A2 is also the gas amount corresponding to the clearance volume. That is to say, in this example, the fresh air charge amount A1 and the residual gas amount A2 are equal to each other. This means that the amount of fresh air flowing from the intake air passage 18 to the exhaust gas passage 20 through the cylinders 14 during one cycle becomes zero (that is, the flow of gas (fresh air) from the intake air passage 18 to the exhaust gas passage 20 through the cylinders 14 stops). In addition, according to the example shown in FIG. 3 in which the intake/exhaust closing timing difference $\Delta VC$ is made zero using the top dead centers (compression top dead center and exhaust top dead center), the gas flow can be stopped in such a manner that the fresh air charge amount A1 and the residual gas amount A2 become minimum.

As described so far, according to the gas flow stopping processing of the present embodiment, the valve timing shown in FIG. 3 is used during the execution of the fuel cut operation. As a result, the "gas flow" can be stopped during the execution of the fuel cut operation. It should be noted that, even if the gas flow stopping processing according to the present embodiment is executed, a gas flow (gas exchange) between the intake air passage 18 and the cylinders 14 and a gas flow (gas exchange) between the exhaust gas passage 20 and the cylinders 14 are (locally) generated. Namely, the stop of the "gas flow" described in this specification means the stop of the gas flow in the whole internal combustion engine 12 (specifically, from the intake air inlet hole 18a to the opening of the tail pipe 20d).

1-2-3. Processing by Control Device

Figure 5:
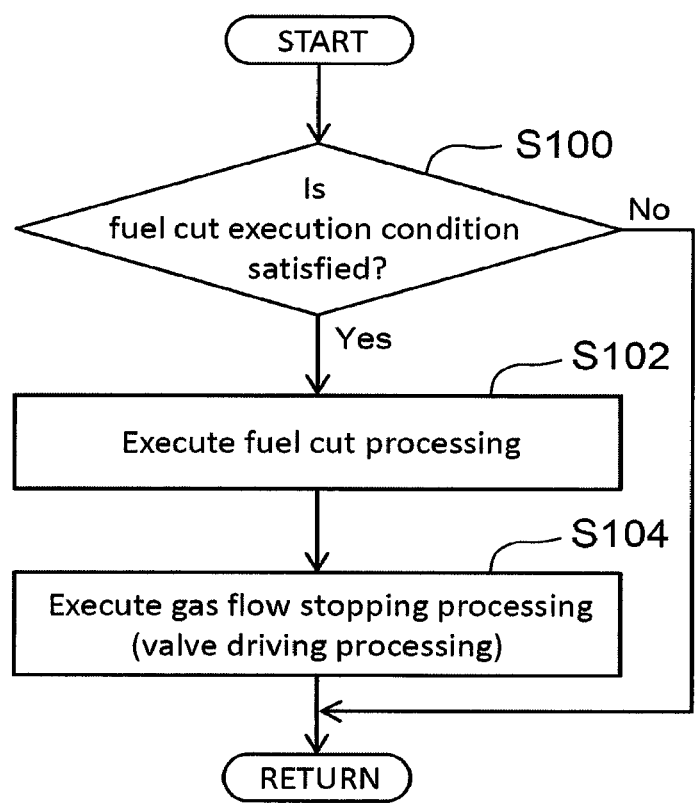
FIG. 5 is a flowchart that shows a routine of the processing concerning an engine control according to the first embodiment of the present disclosure.

FIG. 5 is a flowchart that shows a routine of the processing concerning the engine control according to the first embodiment of the present disclosure. The control device 60 repeatedly executes the processing of the present routine during the operation of the internal combustion engine system 10.

According to the routine shown in FIG. 5, first, in step S100, the control device 60 determines whether or not a predetermined fuel cut execution condition is satisfied. For example, where the engine speed NE is higher than a predetermined value when it is detected using the accelerator position sensor 64 that depression of the accelerator pedal is released (i.e., when the vehicle is decelerated), the fuel cut execution condition is satisfied. Also, the fuel cut execution condition is satisfied, for example, during cranking before the fuel injection is started at the time of start-up of the internal combustion engine 12.

If the determination result of step S100 is negative, that is, if the fuel cut execution condition is not satisfied, the control device 60 ends the current processing cycle. As a result, a valve timing for the non-fuel cut operation, such as the valve timing shown in FIG. 2, is used as the intake and exhaust valve timing.

If, on the other hand, the determination result of step S100 is positive, that is, if the fuel cut execution condition is satisfied, the processing proceeds to step S102. In step S102, the control device 60 executes the fuel cut processing described above. It should be noted that, where the fuel cut processing is executed at the time of deceleration, the throttle valve 26 is closed at an idling opening degree. Thereafter, the processing proceeds to step S104.

In step S104, the control device 60 executes the gas flow stopping processing described above. Specifically, as an example, in order to achieve the valve timing shown in FIG. 3, the intake VVT 36 is controlled such that the closing timing IVC of the intake valve 34 of each cylinder 14 becomes equal to the compression top dead center.

1-3. Effects

As described so far, according to the valve driving processing (gas flow stopping processing) of the present embodiment, the intake VVT 36 is controlled such that the intake/exhaust closing timing difference ΔVC becomes smaller during the fuel cut operation than during the non-fuel cut operation. During the fuel cut operation, the fresh air charge amount A1 described above is mainly determined by the closing timing IVC, and the residual gas amount A2 is mainly determined by the closing timing EVC. Because of this, the reduction of the intake/exhaust closing timing difference ΔVC leads to a reduction of the gas amount difference between the fresh air charge amount A1 and the residual gas amount A2. In addition, this reduction in the gas amount difference leads to a decrease in the flow rate of the fresh air from the intake air passage 18 toward the exhaust gas passage 20 through the cylinders 14. Therefore, by executing the valve driving processing, the inflow of the fresh air into the catalyst 48 can be reduced during the fuel cut operation.

Furthermore, in the example of the gas flow stopping processing according to the present embodiment, the intake VVT 36 is controlled by using the valve timing shown in FIG. 3 such that the intake/exhaust closing timing difference ΔVC is made zero. This can stop, or at least substantially stop, the "gas flow" described above. Therefore, it is possible to effectively reduce the inflow of the fresh air (i.e., the gas having a high oxygen concentration) into the catalyst 48 during the fuel cut operation. As a result, the deterioration of the catalyst 48 caused by the inflow of the fresh air into the catalyst 48 can be reduced. It is also possible to reduce an excessive increase in the oxygen storage amount of the catalyst 48 caused by the inflow of the fresh air.

In addition, in the example of the valve timing shown in FIG. 3, it is possible to reduce the intake/exhaust closing timing difference ΔVC only by retarding the closing timing IVC using the intake VVT 36 without changing the closing timing EVC with respect to that during the non-fuel cut operation. Therefore, even in a low-cost internal combustion engine system having only the intake VVT 36 without the exhaust VVT 44 unlike the internal combustion engine 12, the gas flow stopping processing can be achieved.

1-4. Modification Examples

1-4-1. Fine Adjustment of Intake/Exhaust Closing Timing Difference ΔVC According to Engine Speed NE The flow of gas into and out of the cylinders 14 is strictly affected by the inertia and pulsation (intake pulsation and exhaust pulsation) of the gas. As a result, in the example of the valve timing shown in FIG. 3, the closing timing IVC for causing the fresh air charge amount A1 to equal the amount of the gas contained in the clearance volume and the closing timing EVC for causing the residual gas amount A2 to equal the amount of the gas contained in the clearance volume may be changed by the influence of these inertia and pulsation. Also, the influence of the inertia and pulsation differs depending on the engine speed NE.

Therefore, in the example of the valve timing shown in FIG. 3, the closing timing IVC for stopping the "gas flow" may be changed (finely adjusted) in accordance with the engine speed NE (i.e., in consideration of the influence of the inertia and pulsation) while using the compression top dead center as a basic value of the closing timing IVC. The variation range of the closing timing IVC due to this kind of fine adjustment can be determined, for example, by conducting an experiment in advance.

Figure 6:
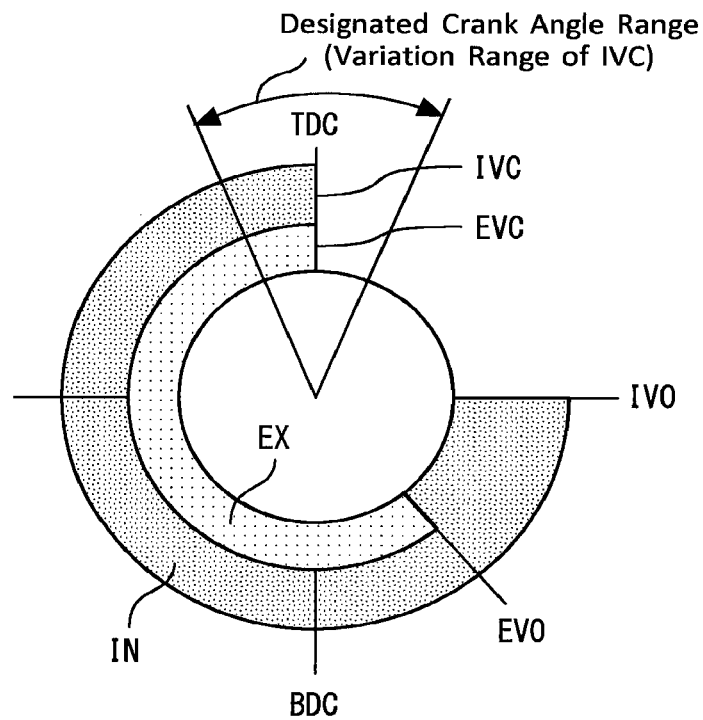
FIG. 6 is a diagram that shows an example of this designated crank angle range by taking the valve timing shown in FIG. 3 as an example.

To be more specific, the variation range described above corresponds to a "designated crank angle range" centered on a basic value at which the intake/exhaust closing timing difference ΔVC is zero. FIG. 6 is a diagram that shows an example of this designated crank angle range by taking the valve timing shown in FIG. 3 as an example. As shown in FIG. 6, the designated crank angle range is about ±20° C.A as an example. Also, this kind of change (fine adjustment) of the intake/exhaust closing timing difference ΔVC according to the engine speed NE may be executed by changing the closing timing EVC with using the exhaust top dead center as a basic value thereof), instead of or in addition to the above described change of the closing timing IVC.

In addition, when the "gas flow" is stopped using the valve timing shown in FIG. 3, the compression top dead center may be selected as the closing timing IVC and the exhaust top dead center may be selected as the closing timing EVC, regardless of the engine speed NE, as described in the first embodiment. According to this example, it can be said that the "gas flow" can be stopped or substantially stopped while allowing some "forward flow" or "backward flow" to be generated depending on the engine speed NE. On the other hand, by performing the above described fine adjustment of the closing timings IVC and EVC in consideration of the influence of the inertia and pulsation of the gas, it becomes possible to more accurately stop the "gas flow" at the individual engine speeds NE. It should be noted that, in the present specification, the term "forward flow"

means a gas flow from the intake air passage 18 toward the exhaust gas passage 20 through the cylinders 14, and the term "backward flow" means a gas flow from the exhaust gas passage 20 toward the intake air passage 18 through the cylinders 14.

1-4-2. Other Examples of Execution Condition of Valve Driving Processing

In the first embodiment described above, the valve driving processing (gas flow stopping processing) is executed together with the fuel cut processing when the fuel cut execution condition is satisfied. The deterioration of the catalyst 48 caused by the inflow of the fresh air into the catalyst 48 is likely to occur when the temperature of the catalyst 48 is high. Therefore, the execution condition of the valve driving processing may be set to be satisfied when the temperature of the catalyst 48 is higher than a predetermined threshold value in addition to the fuel cut execution condition being satisfied. In addition, in an example in which the valve driving processing is used for the purpose of reducing an excessive increase in the oxygen storage amount of the catalyst 48 caused by the inflow of the fresh air, the execution condition of the valve driving processing may be set to be satisfied when the oxygen storage amount is larger than a predetermined threshold value in addition to the fuel cut execution condition being satisfied.

2. Second Embodiment

Next, an internal combustion engine system according to a second embodiment of the present disclosure and modification examples thereof will be described with reference to FIGS. 7 and 8. This internal combustion engine system is the same as the internal combustion engine system 10 according to the first embodiment described above, except for the points described below.

2-1. Outline of Valve Driving Processing (Gas Flow Stopping Processing)

Figure 7:
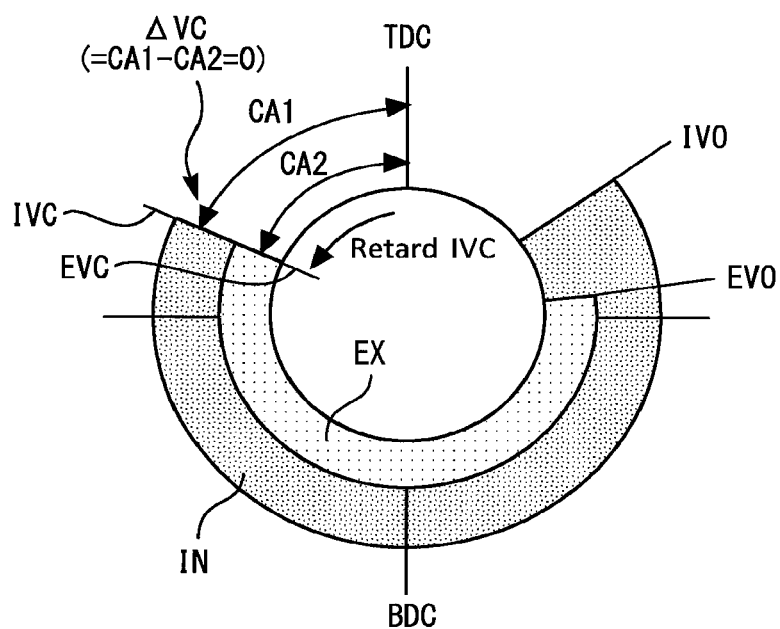
FIG. 7 is a diagram that shows an example of an intake and exhaust valve timing achieved by a valve driving processing (gas flow stopping processing) according to a second embodiment of the present disclosure.

FIG. 7 is a diagram that shows an example of the intake and exhaust valve timing achieved by the valve driving processing (gas flow stopping processing) according to the second embodiment of the present disclosure. According to the gas flow stopping processing of the present embodiment, as shown in FIG. 7, the closing timing IVC of the intake valves 34 is not changed from the position shown in FIG. 2 (i.e., from that during the non-fuel cut operation). On the other hand, the closing timing EVC of the exhaust valves 42 is advanced with respect to the position shown in FIG. 2 such that the second crank angle difference CA2 (the difference of the closing timing EVC with respect to the exhaust top dead center) becomes equal to the first crank angle difference CA1 (the difference of the closing timing IVC with respect to the compressing top dead center). As a result, similarly to the example shown in FIG. 3 according to the first embodiment, the intake/exhaust closing timing difference ΔVC becomes zero. As just described, according to this gas flow stopping processing, the closing timing EVC is advanced by using the exhaust VVT 44 in order to cause the intake/exhaust closing timing difference ΔVC to approach zero.

As described above, according to the present embodiment, the closing timing IVC and the closing timing EVC are aligned on the valve timing diagram as shown in FIG. 7 such that the intake/exhaust closing timing difference ΔVC becomes zero as a result of the advance of the closing timing EVC. In other words, as can be understood from comparing FIG. 2 with FIG. 7, the exhaust VVT 44 is controlled also by the gas flow stopping processing according to the present embodiment such that the "intake/exhaust closing timing difference ΔVC" becomes smaller than that during the non-fuel cut operation.

Figure 8:
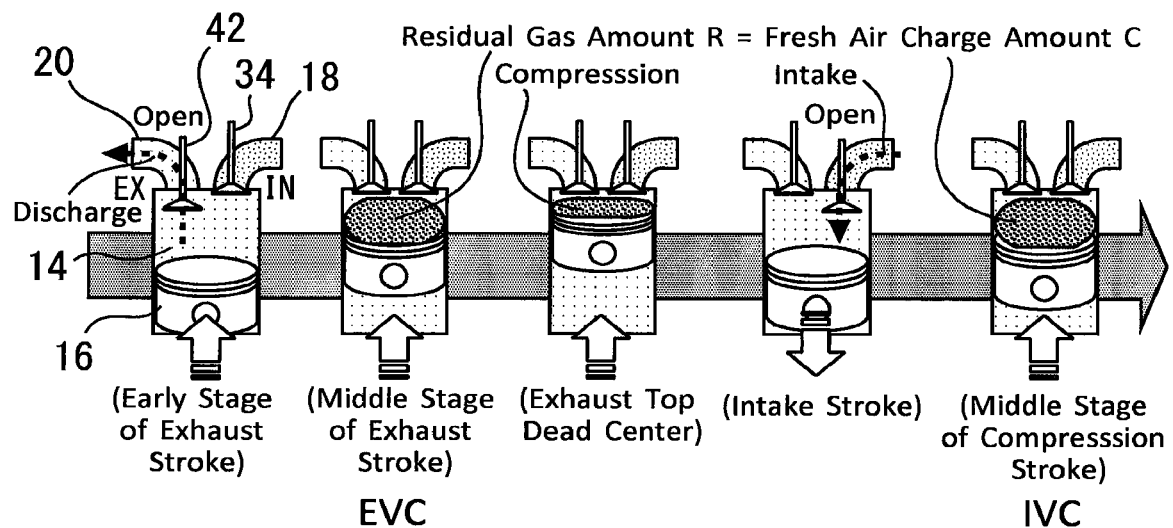
FIG. 8 is a schematic diagram used to explain an operation associated with opening and closing of the intake valves and exhaust valves in an example of setting of the valve timing shown in FIG. 7.

FIG. 8 is a schematic diagram used to explain an operation associated with the opening and closing of the intake valves 34 and the exhaust valves 42 in the example of setting of the valve timing shown in FIG. 7. According to the valve timing shown in FIG. 7, the exhaust valve 42 is opened in the expansion stroke. Thereafter, as shown in FIG. 8, part of the gas in the cylinder 14, which is basically fresh air because the fuel cut operation is in execution, is discharged to the exhaust gas passage 20 associated with the ascent of the piston 16 in the early stage of the exhaust stroke.

The gas left in the cylinder 14 in the early stage of the exhaust stroke remains in the cylinder 14 since the exhaust valve 42 is closed in the subsequent middle stage of the exhaust stroke. In this example, the amount of the gas remaining in the cylinder 14 corresponds to the "residual gas amount A2" described above. In addition, this residual gas is compressed in the exhaust stroke after the closing time EVC, as represented in FIG. 8.

The intake valves 34 is opened in the intake stroke. As a result, as shown in FIG. 8, fresh air is sucked into the cylinder 14 from the intake air passage 18 in association with the descent of the piston 16. Part of the fresh air sucked into the cylinder 14 in the intake stroke is discharged (returned) to the intake air passage 18 in the early stage of the compression stroke.

The fresh air left in the cylinder 14 in the early stage of the compression stroke is trapped (charged) in the cylinder 14 since the intake valve 34 is closed in the subsequent middle stage of the compression stroke. In this example, the amount of the fresh air charged in the cylinder 14 in this manner corresponds to the "fresh air charge amount A1" described above. In addition, this charged fresh air is compressed in the compression stroke after the closing time IVC.

As described so far, according to the gas flow stopping processing of the present embodiment, the valve timing shown in FIG. 7 is used during the execution of the fuel cut operation. Even in the example in which the closing timing EVC is controlled in this manner, since the intake/exhaust closing timing difference ΔVC becomes zero, it is possible to stop the "gas flow" during the execution of the fuel cut operation similarly to the first embodiment.

It should be noted that the control device 60 can execute the gas flow stopping processing according to the present embodiment, in accordance with, for example, a routine (not shown) similar to the routine shown in FIG. 5.

2-2. Effects

As described so far, the valve driving processing (gas flow stopping processing) according to the present embodiment can also reduce the inflow of the fresh air into the catalyst 48 during the fuel cut operation similarly to the first embodiment. Also, in the example of the valve timing shown in FIG. 7, the intake/exhaust closing timing difference ΔVC is reduced only by advancing the closing timing EVC using the exhaust VVT 44 without changing the closing timing IVC with respect to that during the non-fuel cut operation. Therefore, even in a low-cost internal combustion engine system having only the exhaust VVT 44 without the intake VVT 36 unlike the internal combustion engine 12, the valve driving processing can be achieved.

Furthermore, according to the example of the valve timing shown in FIG. 7, not only the compression work caused by the compression of the fresh air having the fresh air charge amount A1 in the compression stroke but also the compression work caused by the compression of the gas having the residual gas amount A2 in the exhaust stroke are generated. Therefore, according to this example, when the fuel cut operation is executed at the time of deceleration, the engine braking force can be enhanced during the fuel cut operation as compared to the example of the valve timing shown in FIG. 3.

2-3. Other Examples of Valve Timing Available in Valve Driving Processing

As already described, the fresh air charge amount A1 is mainly determined by the closing timing IVC, and the residual gas amount A2 is mainly determined by the closing timing EVC. Because of this, the valve timing used in the valve driving processing (gas flow stopping processing) according to the present disclosure may be determined such that the intake/exhaust closing timing difference $\Delta$VC becomes zero at any other closing timing IVC in the compression stroke and any other closing timing EVC in the exhaust stroke, instead of the examples shown in FIGS. 3 and 7 in the first and second embodiments. In addition, in determining the closing timings IVC and EVC in this manner, both of the closing timings IVC and EVC may be controlled, unlike the first and second embodiments.

Furthermore, the closing timings IVC and EVC for making the intake/exhaust closing timing difference $\Delta$VC zero are not limited to be located in the compression stroke and the exhaust stroke, respectively. That is to say, the closing timing IVC may be located in the expansion stroke, and the closing timing EVC may be located in the intake stroke. Alternatively, the closing timing IVC may be located in the intake stroke, and the closing timing EVC may be located in the expansion stroke.

3. Third Embodiment

Next, an internal combustion engine system according to a third embodiment of the present disclosure and modification examples thereof will be described with reference to FIG. 9. This internal combustion engine system is the same as the internal combustion engine system according to the second embodiment described above, except for the points described below.

3-1. Valve Driving Processing Using Closing Timing EVC (Generation of Forward Flow with Low Flow Rate)

According to the first and second embodiments described above, the "valve driving processing" (i.e., the processing to cause the intake/exhaust closing timing difference to be smaller during the fuel cut operation than during the non-fuel cut operation) according to the present disclosure is executed, as an example, as the "gas flow stopping processing" for causing the intake/exhaust closing timing difference $\Delta$VC to approach zero.

On the other hand, the "valve driving processing" according to the present embodiment is executed in order to generate a "forward flow" with a desired low flow rate by causing the intake/exhaust closing timing difference $\Delta$VC to be other than zero. In detail, according to this valve driving processing, the exhaust VVT 44 is controlled so as to obtain the valve timing shown in FIG. 9 as an example.

Figure 9:
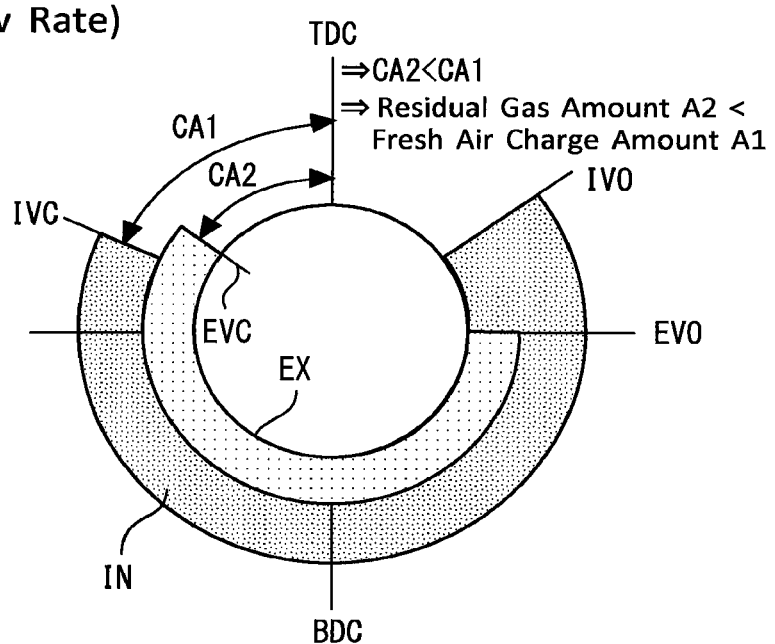
FIG. 9 is a diagram that shows an example of a valve timing used in a valve driving processing according to a third embodiment of the present disclosure.

FIG. 9 is a diagram that shows an example of the valve timing used in the valve driving processing according to the third embodiment of the present disclosure. The valve timing shown in FIG. 9 is different from the valve timing shown in FIG. 7 according to the second embodiment in the following points.

Specifically, in the example shown in FIG. 9, the second crank angle difference CA2 is made smaller than the first crank angle difference CA1 by retarding the closing timing EVC during the exhaust stroke. That is to say, the intake/exhaust closing timing difference $\Delta$VC is set such that the residual gas amount A2 becomes smaller than the fresh air charge amount A1. As a result, the "forward flow" of the gas (fresh air) can be generated.

To be more specific, by adjusting the intake/exhaust closing timing difference $\Delta$VC such that a gas amount difference $\Delta$G1 obtained by subtracting the residual gas amount A2 from the fresh air charge amount A1 becomes greater, the gas flow rate of the forward flow can be made higher. In the example shown in FIG. 9, since the closing timing EVC is located in the exhaust stroke, the gas amount difference $\Delta$G1 can be increased by increasing the retard amount of the closing timing EVC, and as a result, the gas flow rate of the forward flow can be increased. Conversely, by adjusting the intake/exhaust closing timing difference $\Delta$VC such that the gas amount difference $\Delta$G1 becomes smaller (i.e., by reducing the retard amount of the closing timing EVC), the gas flow rate of the forward flow can be reduced. As just described, by controlling the retard amount of the closing timing EVC and adjusting the magnitude of the intake/exhaust closing timing difference $\Delta$VC, the gas flow rate of the forward flow can be adjusted to a desired value.

According to the valve driving processing of the present embodiment, the valve timing as shown in FIG. 9 is used in order to generate a forward flow with a low flow rate. The low flow rate mentioned here is determined so as to become smaller than the flow rate of the fresh air passing through the catalyst 48 during the fuel cut operation when the valve driving processing is not performed. More specifically, the retard amount of the closing timing EVC for generating the forward flow with this kind of low flow rate may be set within, for example, a crank angle range of 0° to 20° with taking, as a reference, the closing timing EVC obtained when the gas flow is stopped (i.e., when the intake/exhaust closing timing difference $\Delta$VC is made zero). Alternatively, the retard amount may be set within a wider crank angle range of 0° to 30°.

The valve driving processing according to the present embodiment described so far may be used as another example of the "valve driving processing (i.e., the processing to cause the intake/exhaust closing timing difference to be smaller during the fuel cut operation than during the non-fuel cut operation) according to the present disclosure. This kind of valve driving processing also makes it possible to reduce the inflow of the fresh air into the catalyst 48 during the fuel cut operation as compared to the example in which the valve driving processing is not executed.

3-2. Modification Examples

Next, modification examples with respect to the third embodiment using the valve driving processing for generating the forward flow with a low flow rate will be described.

3-2-1. Examples of Using Closing Timing IVC

The valve driving processing for generating the forward flow with a low flow rate may be performed by using the intake VVT 36, instead of the example of shown in FIG. 9 using the exhaust VVT 44. In detail, the first crank angle difference CA1 can be made greater than the second crank angle difference CA2, for example, by advancing the closing timing IVC within the compressing stroke. Since this kind of manner can also set the intake/exhaust closing timing difference ΔVC such that the residual gas amount A2 becomes smaller than the fresh air charge amount A1, the "forward flow" of the gas (fresh air) can be generated.

Therefore, in order to reduce the flow rate of the fresh air flowing into the catalyst 48 during the fuel cut operation, a valve driving processing with the control of the closing timing IVC using the intake VVT 36 may be used based on the same idea as in the third embodiment. Furthermore, in order to generate the forward flow with a low flow rate, this kind of control of the closing timing IVC may be performed in combination with the control of the closing timing EVC according to the third embodiment.

3-2-2. Control Examples of Closing Timing EVC/IVC in Intake Stroke or Expansion Stroke First, in the example in which the closing timing EVC is controlled in the intake stroke, in increasing the gas flow rate of the forward flow, the closing timing EVC is retarded (i.e., the closing timing EVC is caused to approach the exhaust top dead center) in order to reduce the residual gas amount A2. Conversely, in reducing the gas flow rate of the forward flow, the closing timing EVC is advanced.

In the example in which the closing timing EVC is controlled in the expansion stroke, in increasing the gas flow rate of the forward flow, the closing timing EVC is advanced (i.e., the closing timing EVC is moved away from the expansion bottom dead center) in order to reduce the residual gas amount A2. Conversely, in reducing the gas flow rate of the forward flow, the closing timing EVC is retarded.

Next, in the example in which the closing timing IVC is controlled in the expansion stroke, in increasing the gas flow rate of the forward flow, the closing timing IVC is retarded (i.e., the closing timing IVC is moved away from the compression top dead center) in order to increase the fresh air charge amount A1. Conversely, in reducing the gas flow rate of the forward flow, the closing timing IVC is advanced.

In the example in which the closing timing IVC is controlled in the intake stroke, in increasing the gas flow rate of the forward flow, the closing timing IVC is retarded (i.e., the closing timing IVC is caused to approach the intake bottom dead center) in order to increase the fresh air charge amount A1. Conversely, in reducing the gas flow rate of the forward flow, the closing timing IVC is advanced.

4. Fourth Embodiment

Next, an internal combustion engine system according to a fourth embodiment of the present disclosure and modification examples thereof will be described with reference to FIG. 10. This internal combustion engine system is the same as the internal combustion engine system according to the third embodiment described above, except for the points described below.

4-1. Valve Driving Processing Using Closing Timing EVC (Generation of Backward Flow with Low Flow Rate)

Contrary to the third embodiment, the "valve driving processing" according to the present embodiment is executed in order to generate a "backward flow" with a desired low flow rate by causing the intake/exhaust closing timing difference ΔVC to be other than zero. In detail, according to this valve driving processing, the exhaust VVT 44 is controlled so as to obtain the valve timing shown in FIG. 10 as an example.

Figure 10:
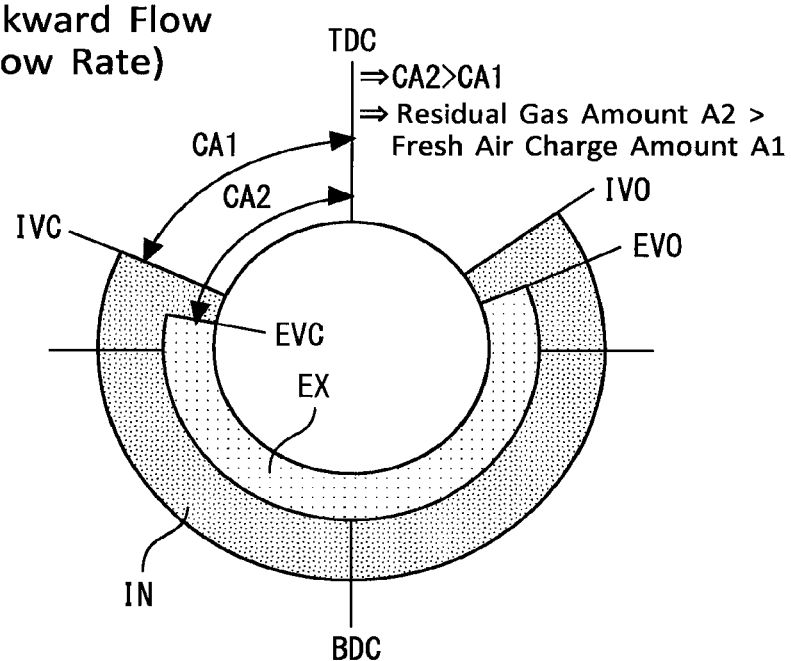
FIG. 10 is a diagram that shows an example of a valve timing used in a valve driving processing according to a fourth embodiment of the present disclosure.

FIG. 10 is a diagram that shows an example of the valve timing used in the valve driving processing according to the fourth embodiment of the present disclosure. The valve timing shown in FIG. 10 is different from the valve timing shown in FIG. 7 according to the second embodiment in the following points.

Specifically, in the example shown in FIG. 10, the second crank angle difference CA2 is made greater than the first crank angle difference CA1 by advancing the closing timing EVC during the exhaust stroke. That is to say, the intake/exhaust closing timing difference ΔVC is set such that the residual gas amount A2 becomes greater than the fresh air charge amount A1. As a result, the "backward flow" of the gas (fresh air) can be generated.

To be more specific, by adjusting the intake/exhaust closing timing difference ΔVC such that a gas amount difference ΔG2 obtained by subtracting the fresh air charge amount A1 from the residual gas amount A2 becomes greater, the gas flow rate of the backward flow can be made higher. In the example shown in FIG. 10, since the closing timing EVC is located in the exhaust stroke, the gas amount difference ΔG2 can be increased by increasing the advance amount of the closing timing EVC, and as a result, the gas flow rate of the backward flow can be increased. Conversely, by adjusting the intake/exhaust closing timing difference ΔVC such that the gas amount difference ΔG2 becomes smaller (i.e., by reducing the advance amount of the closing timing EVC), the gas flow rate of the backward flow can be reduced. As just described, by controlling the advance amount of the closing timing EVC and adjusting the magnitude of the intake/exhaust closing timing difference ΔVC, the gas flow rate of the backward flow can be adjusted to a desired value.

According to the valve driving processing of the present embodiment, the valve timing as shown in FIG. 10 is used to generate a backward flow with a low flow rate. The low flow rate in the example of generating this kind of backward flow is determined to have the similar magnitude to that in the above described example of the forward flow. More specifically, the advance amount of the closing timing EVC for generating the backward flow with this kind of low flow rate may be set within, for example, a crank angle range of 0° to 20° with taking, as a reference, the closing timing EVC obtained when the gas flow is stopped (i.e., when the intake/exhaust closing timing difference ΔVC is made zero). Alternatively, the advance amount may be set within a wider crank angle range of 0° to 30°. However, if the flow rate of the gas at the time of this kind of backward flow is too high, the flow rate of the gas returned from the exhaust gas passage 20 to the intake air passage 18 through the cylinders 14 during the fuel cut operation becomes high. Therefore, the intake/exhaust closing timing difference ΔVC in using the backward flow may be set so as to minimize the gas flow rate of the backward flow.

The valve driving processing according to the present embodiment described so far may be used as another example of the "valve driving processing" according to the present disclosure. This kind of valve driving processing also makes it possible to reduce the inflow of the fresh air into the catalyst 48 during the fuel cut operation as compared to the example in which the valve driving processing is not executed.

4-2. Modification Examples

Next, modification examples with respect to the fourth embodiment using the valve driving processing for generating the backward flow with a low flow rate will be described.

4-2-1. Examples of Using Closing Timing IVC

The valve driving processing for generating the backward flow with a low flow rate may be performed by using the intake VVT 36, instead of the example shown in FIG. 10 using the exhaust VVT 44. In detail, the first crank angle difference CA1 can be made smaller than the second crank angle difference CA2, for example, by retarding the closing timing IVC within the compressing stroke. Since this kind of manner can also set the intake/exhaust closing timing difference ΔVC such that the residual gas amount A2 becomes greater than the fresh air charge amount A1, the "backward flow" of the gas (fresh air) can be generated.

Therefore, in order to reduce the inflow of fresh air into the catalyst 48 during the fuel cut operation, a valve driving processing with the control of the closing timing IVC using the intake VVT 36 may be used based on the same idea as in the fourth embodiment. Further, in order to generate the backward flow with a low flow rate, this kind of control of the closing timing IVC may be performed in combination with the control of the closing timing EVC according to the fourth embodiment.

4-2-2. Control Examples of Closing Timing EVC/IVC in Intake Stroke or Expansion Stroke First, in the example in which the closing timing EVC is controlled in the intake stroke, in increasing the gas flow rate of the backward flow, the closing timing EVC is advanced (i.e., the closing timing EVC is moved away from the exhaust top dead center) in order to increase the residual gas amount A2. Conversely, in reducing the gas flow rate of the backward flow, the closing timing EVC is retarded.

In the example in which the closing timing EVC is controlled in the expansion stroke, in increasing the gas flow rate of the backward flow, the closing timing EVC is retarded (i.e., the closing timing EVC is caused to approach the expansion bottom dead center) in order to increase the residual gas amount A2. Conversely, in reducing the gas flow rate of the backward flow, the closing timing EVC is advanced.

Next, in an example in which the closing timing IVC is controlled in the expansion stroke, in increasing the gas flow rate of the backward flow, the closing timing IVC is advanced (i.e., the closing timing IVC is caused to approach the compression top dead center) in order to reduce the fresh air charge amount A1. Conversely, in reducing the gas flow rate of the backward flow, the closing timing IVC is retarded.

In the example in which the closing timing IVC is controlled in the intake stroke, in increasing the gas flow rate of the backward flow, the closing timing IVC is advanced (i.e., the closing timing IVC is moved away from the intake bottom dead center) in order to reduce the fresh air charge amount A1. Conversely, in reducing the gas flow rate of the backward flow, the closing timing IVC is retarded.

5. Fifth Embodiment

Next, an internal combustion engine system according to a fifth embodiment of the present disclosure and modification examples thereof will be described with reference to FIGS. 11 to 13. This internal combustion engine system is the same as the internal combustion engine system according to the second embodiment described above, except for the points described below.

5-1. Outline of Valve Driving Processing Including Feedback Processing

As already described, the control of the "gas flow" by the valve driving processing is affected by the inertia and the pulsation (intake pulsation and exhaust pulsation) of the gas which changes depending on to the engine speed NE. Because of this, it may be difficult to always and reliably stop the "gas flow" only by making the intake/exhaust closing timing difference ΔVC zero using the gas flow stopping processing. Therefore, the valve driving processing according to the present embodiment includes the following "feedback processing" in addition to the "gas flow stopping processing".

Figure 11:
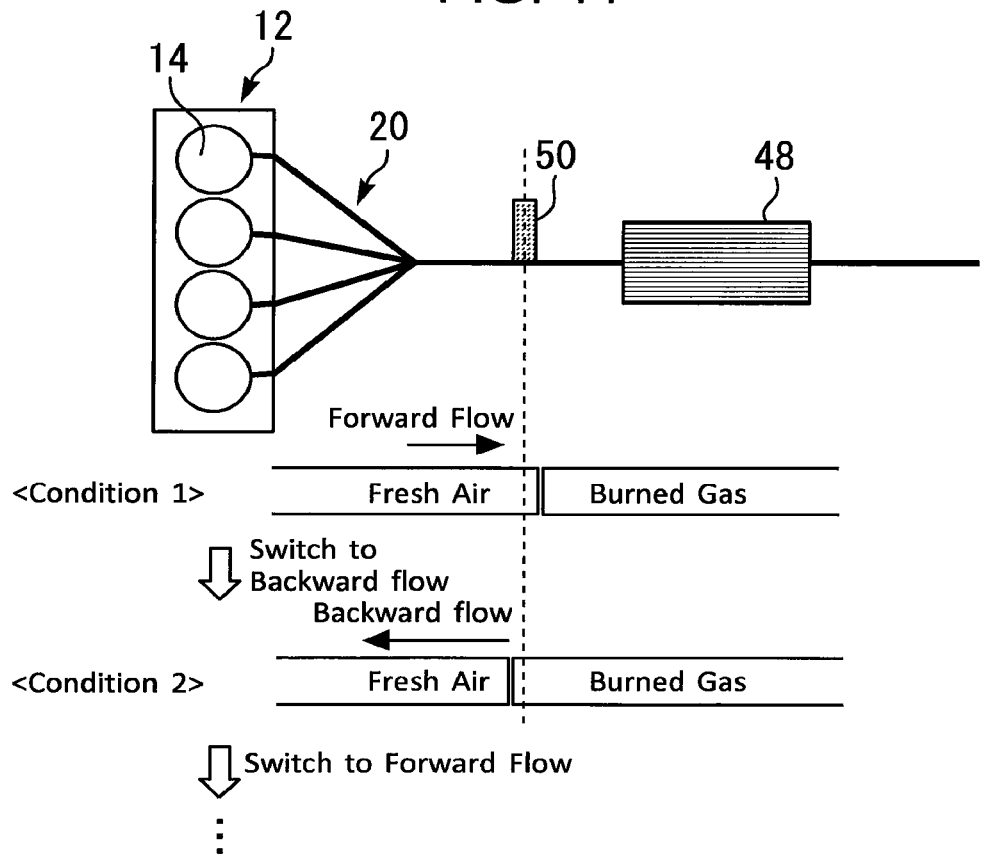
FIG. 11 is a schematic diagram used to explain the outline of a feedback processing according to a fifth embodiment of the present disclosure.

FIG. 11 is a schematic diagram used to explain the outline of the feedback processing according to the fifth embodiment of the present disclosure. Where the gas flow stopping processing is started in association with the start of the fuel cut processing, the "forward flow" of the fresh air is generated until the operation of the variable valve operating device (in the present embodiment, the exhaust VVT 44) for making zero the intake/exhaust closing timing difference ΔVC is completed. In addition, even after the operation of the exhaust VVT 44 is completed, a forward flow may be generated due to the influence of the inertia and pulsation of the gas described above.

When the fresh air reaches the position of the air fuel ratio sensor 50 as a condition 1 shown in FIG. 11 as a result of generation of the forward flow after the start of the fuel cut processing, the output of the air fuel ratio sensor 50 changes. Specifically, the output value of the air fuel ratio sensor 50 changes from an output value depending on the target air fuel ratio (e.g., the stoichiometric air fuel ratio) of the burned gas in an engine operating condition immediately before the start of the fuel cut operation to an output value depending on the fresh air.

According to the feedback processing, when the above described change of the air fuel ratio is detected, the exhaust VVT 44 is controlled such that the fresh air charge amount A1 is made smaller than the residual gas amount A2 to generate the "backward flow". In detail, the exhaust VVT 44 is controlled such that, for example, the valve timing shown in FIG. 10 is selected. It should be noted that the residual gas (fresh air) with an amount that depends to the difference between the residual gas amount A2 and the fresh air charge amount A1 when the backward flow is generated is returned to the intake air passage 18 in the intake stroke of the next cycle.

A condition 2 shown in FIG. 11 is formed when the boundary between the fresh air and the burned gas in the exhaust gas passage 20 is returned to the upstream of the air fuel ratio sensor 50 after the backward flow as described above is generated. When this condition 2 is formed, the output of the air fuel ratio sensor 50 changes to a value depending on the air fuel ratio of the burned gas.

According to the feedback processing, when the above described change of the air fuel ratio is detected, the exhaust VVT 44 is controlled such that the fresh air charge amount A1 is made greater than the residual gas amount A2 to generate the "forward flow". In detail, the exhaust VVT 44 is controlled such that, for example, the valve timing shown in FIG. 9 is selected. It should be noted that the fresh air with an amount that depends on the difference between the fresh air charge amount A1 and the residual gas amount A2 when the forward flow is generated is discharged to the exhaust gas passage 20 in the exhaust stroke.

As described so far, according to the feedback processing, switching between the backward flow and the forward flow of the gas using the exhaust VVT 44 is repeatedly performed in accordance with a change in the output of the air fuel ratio sensor 50 as described above. It should be noted that the feedback processing according to the present embodiment corresponds to an example of the "first feedback processing" according to the present disclosure.

In addition, the respective flow rates at the time of the "forward flow" and the "backward flow" generated by the feedback processing are "low flow rates" as described in the third and fourth embodiments. Thus, as a variable range of the closing timing EVC used for this kind of switching between the forward flow and the backward flow, a designated crank angle range (for example, ±20° C.A), which is centered on a basic value that is a closing timing EVC obtained when the intake/exhaust closing timing difference ΔVC is zero, may be used. The designated crank angle range may be a wider range (for example, ±30° C.A). It should be noted that this may be similarly applied to an example described below in which the closing timing IVC is changed to switch between the forward flow and the backward flow.

Furthermore, in other words, even during the feedback processing described above, the exhaust VVT 44 is controlled such that the "intake/exhaust closing timing difference ΔVC" becomes smaller than that during the non-fuel cut operation, similarly to when the gas flow stopping processing is performed.

5-2. Processing by Control Device

Figure 12:
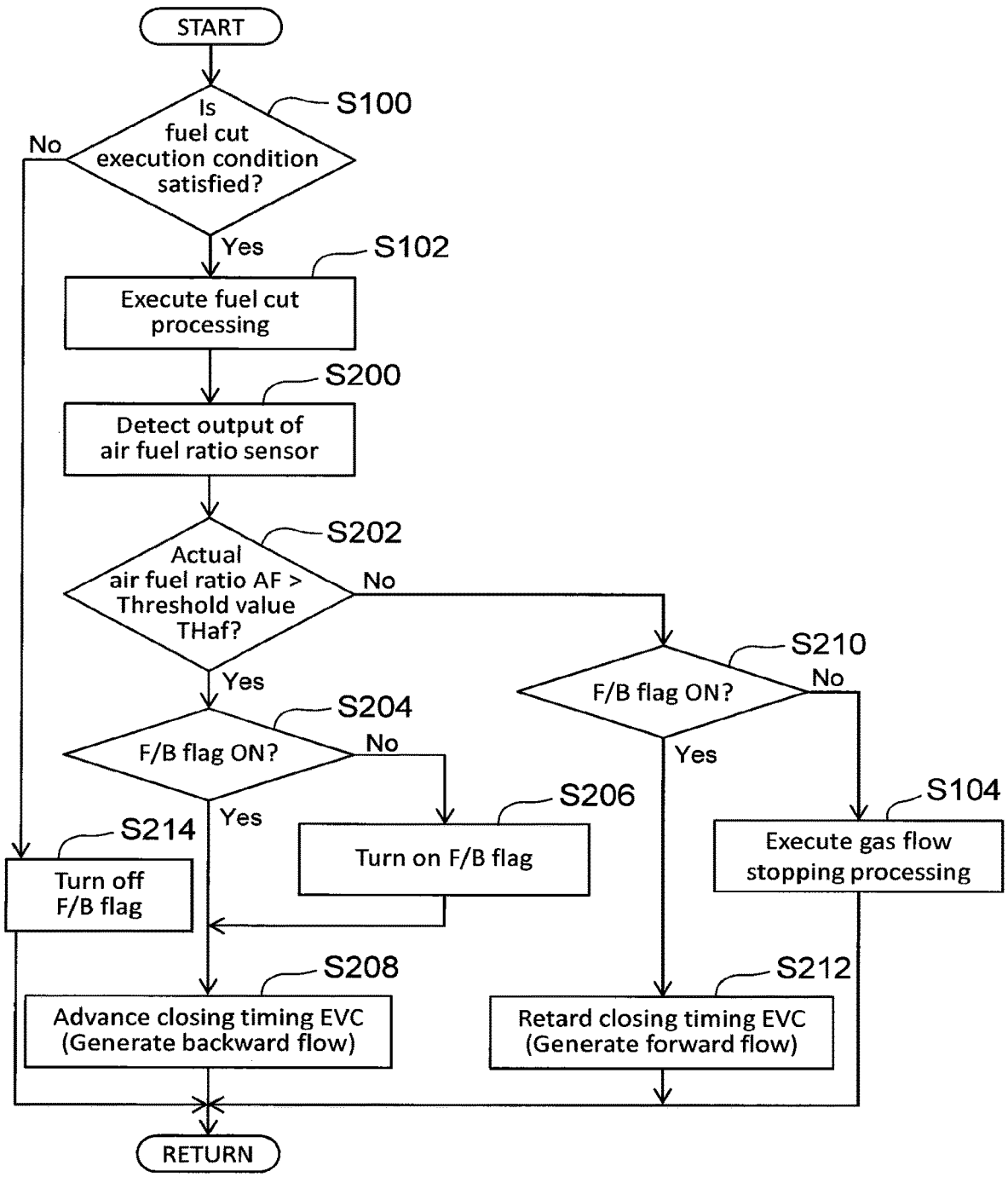
FIG. 12 is a flowchart that shows a routine of processing concerning an engine control according to the fifth embodiment of the present disclosure.

FIG. 12 is a flowchart that shows a routine of the processing concerning the engine control according to the fifth embodiment of the present disclosure. The processing of steps S100 to S104 in the routine shown in FIG. 12 is as already described in the first embodiment.

According to the routine shown in FIG. 12, after the fuel cut processing is executed in step S102, the processing proceeds to step S200. In step S200, the control device 60 detects the output of the air fuel ratio sensor 50. Thereafter, the processing proceeds to step S202.

In step S202, the control device 60 determines whether or not the actual air fuel ratio AF of the exhaust gas based on the output of the air fuel ratio sensor 50 is higher (i.e., leaner) than a predetermined threshold THaf. In more detail, this threshold value THaf is a value greater, by a predetermined value a, than the target air fuel ratio at the engine operating condition immediately before the fuel cut processing is started. As the predetermined value a, for example, a value of about 0.4 to 1.0 is used. When the target air fuel ratio is the stoichiometric air fuel ratio of about 14.6, 15 is, for example, used as the threshold THaf. It should be noted that the threshold THaf corresponds to an example of the "air fuel ratio threshold" according to the present disclosure.

If the determination result of step S202 is positive (i.e., the actual air fuel ratio AF>threshold THaf), the processing proceeds to step S204. In step S204, the control device 60 determines whether or not an F/B flag is turned on. This F/B flag is turned in a condition in which the feedback processing should be performed. It should be noted that the F/B flag is turned off when the currently executed fuel cut processing is completed (step S214).

If the determination result of step S204 is negative, that is, if the actual air fuel ratio AF becomes higher than the threshold value THaf for the first time after the fuel cut operation is started, the processing proceeds to step S206. In step S206, the control device 60 turns on the F/B flag. Thereafter, the processing proceeds to step S208. In response to the F/B flag being turned on, the feedback processing is started. In step S208, the control device 60 controls the exhaust VVT 44 such that the closing timing EVC located in the exhaust stroke is advanced in order to increase the residual gas amount A2 and (aggressively) generate the backward flow. For example, the valve timing shown in FIG. 10 is herein used.

If, on the other hand, the determination result of step S204 is positive, that is, if it is not the first time that the actual air fuel ratio AF becomes higher than the threshold THaf after the fuel cut operation is started, the processing directly proceeds to step S208 (i.e., the feedback processing is continuously executed).

Moreover, if the determination result of step S202 is negative (i.e., actual air fuel ratio AF≤the threshold THaf), the processing proceeds to step S210. In step S210, the control device 60 determines whether or not the F/B flag is turned on. As a result, if the F/B flag is not turned on, that is, if the actual air fuel ratio AF is not greater than the threshold THaf even once after the fuel cut operation is started, the processing proceeds to step S104. As a result, the gas flow stopping processing is executed. It should be noted that, if the fuel cut operation is terminated during the execution of the gas flow stopping processing, the feedback processing is not executed during this fuel cut operation.

If, on the other hand, the determination result of step S210 is positive, that is, if the feedback processing has been started, the processing proceeds to step S212. In step S212, the control device 60 controls the exhaust VVT 44 such that the closing timing EVC is retarded in order to reduce the residual gas amount A2 and (aggressively) generate a forward gas flow. For example, the valve timing shown in FIG. 9 is herein used.

5-3. Effects

As described so far, according to the engine control of the present embodiment, when the gas flow stopping processing is executed during the fuel cut operation, the feedback processing is executed as necessary.

Specifically, according to the feedback processing, where the actual air fuel ratio AF is higher than the threshold value THaf, that is, after the fresh air is reached to the position of the air fuel ratio sensor 50, the exhaust VVT 44 is controlled such that the backward flow (fresh air charge amount A1<residual gas amount A2) is generated. This can prevent the fresh air from reaching the catalyst 48 located on the downstream side of the air fuel ratio sensor 50.

The fresh air that has passed through the combustion chamber once as a result of the execution of the fuel cut operation contains oil (lubrication oil) from the combustion chamber. An unnecessary backward flow of this kind of gas to the upstream portion of the intake air passage 18 is not favorable from the viewpoints of fouling of the air flow sensor 24, an increase of deposits adhering to the wall surface of the intake air passage 18, and prevention of discharge of the oil into the atmosphere. According to the feedback processing, if the actual air fuel ratio AF becomes equal to or lower than the threshold value THaf after the generation of the backward flow, that is, if the burned gas returns to the position of the air fuel ratio sensor 50, the exhaust VVT 44 is controlled such that the forward flow (fresh air charge amount A1>residual gas amount A2) is generated. As a result, an excessive backward flow can be prevented from being generated.

Furthermore, according to the example of the routine shown in FIG. 12, while the fuel cut operation is continued after the start of the feedback processing, the generation of the backward flow/forward flow is repeatedly executed in accordance with the actual air fuel ratio AF based on the output of the air fuel ratio sensor 50. Therefore, according to the feedback processing of the present embodiment, even when it is difficult to completely stop the "gas flow" by the gas flow stopping processing alone due to the influence of the inertia and the pulsation of the gas, the inflow of the fresh air into the catalyst 48 can be reduced while an excessive backward flow is reduced.

5-4. Modification Examples

Next, other control examples (modification examples) of the gas flow in performing the feedback processing using the output of the air fuel ratio sensor 50 will be described.

5-4-1. Another Control Example at Arrival of Burned Gas (Another Example of First Feedback Processing)

According to the fifth embodiment described above, after the actual air fuel ratio AF becomes equal to or lower than the threshold THaf after the generation of the backward flow (that is, after the burned gases is reached (returned) to the position of the air fuel ratio sensor 50), the closing timing EVC is controlled such that the forward flow is generated. However, after the actual air fuel ratio AF becomes equal to or less than the threshold value THaf, the closing timing EVC may be controlled such that the generation of the backward flow is stopped instead of this kind of example.

Figure 13:
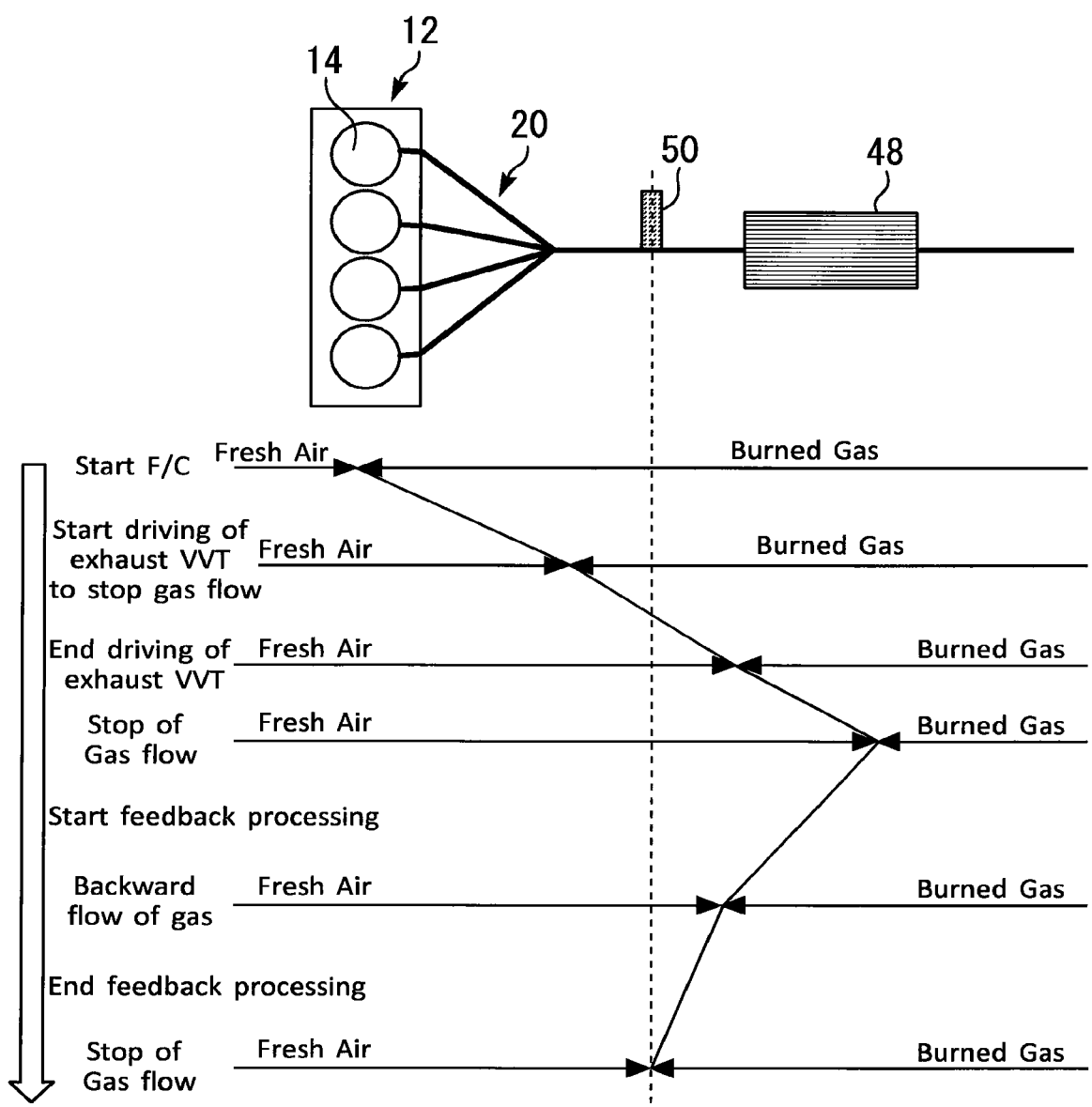
FIG. 13 is a diagram that conceptually illustrates an example of an operation by the feedback processing in which generation of a backward flow is stopped when an actual air fuel ratio AF becomes equal to or lower than a threshold THaf.

FIG. 13 is a diagram that conceptually illustrates an example of an operation by the feedback processing in which the generation of the backward flow is stopped when the actual air fuel ratio AF becomes equal to or lower than the threshold THaf. When the fuel cut (F/C) operation is started, the gas flow stopping processing is executed. FIG. 13 shows an operation of an example in which there is a response delay in the operation of the exhaust VVT 44 according to the gas flow stopping processing executed when the fuel cut operation is started.

In the example shown in FIG. 13, due to the response delay described above, the fresh air is reached to the catalyst 48 before the operation of the exhaust VVT 44 according to the gas flow stopping processing is ended (completed) after the start of the fuel cut operation. Thereafter, the gas flow is stopped. After the fresh air is detected by the air fuel ratio sensor 50 (i.e., actual air fuel ratio AF>threshold THaf), the feedback processing is started. As a result of the generation of the backward flow by this feedback processing, the boundary between the fresh air and the burned gas moves to the upstream side.

In the example shown in FIG. 13, after the burned gas is reached to the position of the air fuel ratio sensor 50 thereafter (actual air fuel ratio AF≤threshold THaf), the gas flow stopping processing is restarted, and the gas flow is thus stopped (i.e., the generation of the backward flow by the feedback processing is stopped). This kind of control example can be achieved, for example, by changing the routine shown in FIG. 12 as follows. That is to say, for example, the processing of steps S204, S206, and S210 to S214 is omitted. In addition, if the determination result of step S202 is positive, the processing proceeds to step S208. If, on the other hand, this determination result is negative, the processing proceeds to step S104.

Additionally, according to the present control example using the generation of the backward flow similarly to the fifth embodiment, even when the fresh air is supplied to the catalyst 48 due to the response delay of the exhaust VVT 44 as in the operation example shown in FIG. 13, the burned gas can be supplied to the catalyst 48 from the outlet side thereof by using the backward flow. Because of this, the oxygen excess state of the catalyst 48 can be quickly eliminated.

5-4-2. Another Control Example at Arrival of Fresh Air (Another Example of First Feedback Processing)

Moreover, according to the fifth embodiment, after the actual air fuel ratio AF becomes higher than the threshold value THaf, that is, after fresh air is reached to the position of the air fuel ratio sensor 50, the closing timing EVC is controlled such that the backward flow is generated. However, after the actual air fuel ratio AF becomes higher than the threshold value THaf, the closing timing EVC may be controlled such that the flow rate of the "forward flow" decreases in step S208, instead of the example described in the fifth embodiment. Even with this kind of control example, it is possible to reduce the inflow of the fresh air into the catalyst 48 during the fuel cut operation, as compared to the example in which the valve driving processing is not associated with the feedback processing. According to this control example, although the effect of reducing the inflow of the fresh air into the catalyst 48 is smaller than that at the time of the generation of the backward flow, it is unnecessary to take measures against the above described issue caused by the generation of the backward flow, such as the fouling of the air flow sensor 24.

5-4-3. Examples of Using Closing Timing IVC

The feedback processing (i.e., the first feedback processing) according to the fifth embodiment or the other control examples described above may be executed using the intake VVT 36 instead of the exhaust VVT 44. Specifically, in an example in which the closing timing IVC is controlled within, for example, the compression stroke, the closing timing IVC is retarded in generating the backward flow, and is advanced in generating the forward flow. Furthermore, in order to execute the feedback processing, this kind of control of the closing timing IVC may be executed in combination with the control of the closing timing EVC described above.

6. Sixth Embodiment

Next, an internal combustion engine system according to a sixth embodiment of the present disclosure and modification examples thereof will be described with reference to FIGS. 14 and 15. This internal combustion engine system is the same as the internal combustion engine system according to the second embodiment described above, except for the points described below.

6-1. Outline of Valve Driving Processing Including Feedback Processing

The valve driving processing according to the present embodiment also includes the following "feedback processing" in addition to the "gas flow stopping processing". However, the feedback processing according to the present embodiment is executed using an "integrated fresh air amount M1" described below, instead of the output of the air fuel ratio sensor 50 in the fifth embodiment.

Specifically, the feedback processing according to the present embodiment includes an "integrated fresh air amount calculation processing" that calculates the integrated fresh air amount M1. The integrated fresh air amount M1 corresponds to an integrated value of the fresh air flowing from the intake air passage 18 toward the exhaust gas passage 20 through the cylinders 14 after the start of the fuel cut processing.

According to the present embodiment, as an example, the integrated fresh air amount calculation processing calculates an integrated fresh air amount M1 [g] on the basis of the fresh air flow rate Ga [g/s] detected using the air flow sensor 24. The following Equation (1) is a calculation equation of the integrated fresh air amount M1.

$$M1(k)=M1(k-1)+Ga \cdot \Delta t \quad (1)$$

According to Equation (1), the current value $M1(k)$ of the integrated fresh air amount M1 is calculated by adding, to the last value $M1(k-1)$ thereof, the product of the fresh air flow rate Ga and a known calculation period $\Delta t$ (=current time point−last calculation time point). The influence of the control of the "gas flow" by the gas flow stopping processing and the feedback processing appears on the output of the air flow sensor 24. Because of this, the integrated fresh air amount M1 calculated in this manner increases with a lapse of time when the "forward flow" of the fresh air continues (that is, when the fresh air flow rate Ga is a positive value), and decreases with a lapse of time when the "backward flow" of the fresh air continues (that is, when the fresh air flow rate Ga is a negative value).

According to the feedback processing of the present embodiment, when this integrated fresh air amount M1 is greater than a predetermined threshold value TH1 (i.e., target value), the exhaust VVT 44 is controlled such that the "backward flow" is generated, and, on the other hand, when the integrated fresh air amount M1 is equal to or less than the threshold TH1, the exhaust VVT 44 is controlled such that the "forward flow" is generated. It should be noted that the feedback processing according to the present embodiment corresponds to an example of the "second feedback processing" according to the present disclosure.

As the threshold value TH1, a value equal to or less than the amount of the fresh air contained in a volume A (see FIG. 16 described below) of a catalyst upstream portion 20b, which is a portion of the exhaust gas passage 20 located on the upstream side of the catalyst 48 can be used. As an example, a value equal to the amount of the fresh air contained in this volume A is used as the threshold value TH1. In more detail, the catalyst upstream portion 20b mentioned here corresponds to a portion of the exhaust gas passage 20 located between an end of the exhaust port 20a on the side of the cylinders 14 and an inlet of the catalyst 48. It should be noted that the threshold value TH1 corresponds to an example of the "fresh air amount threshold value".

6-2. Processing by Control Device

Figure 14:
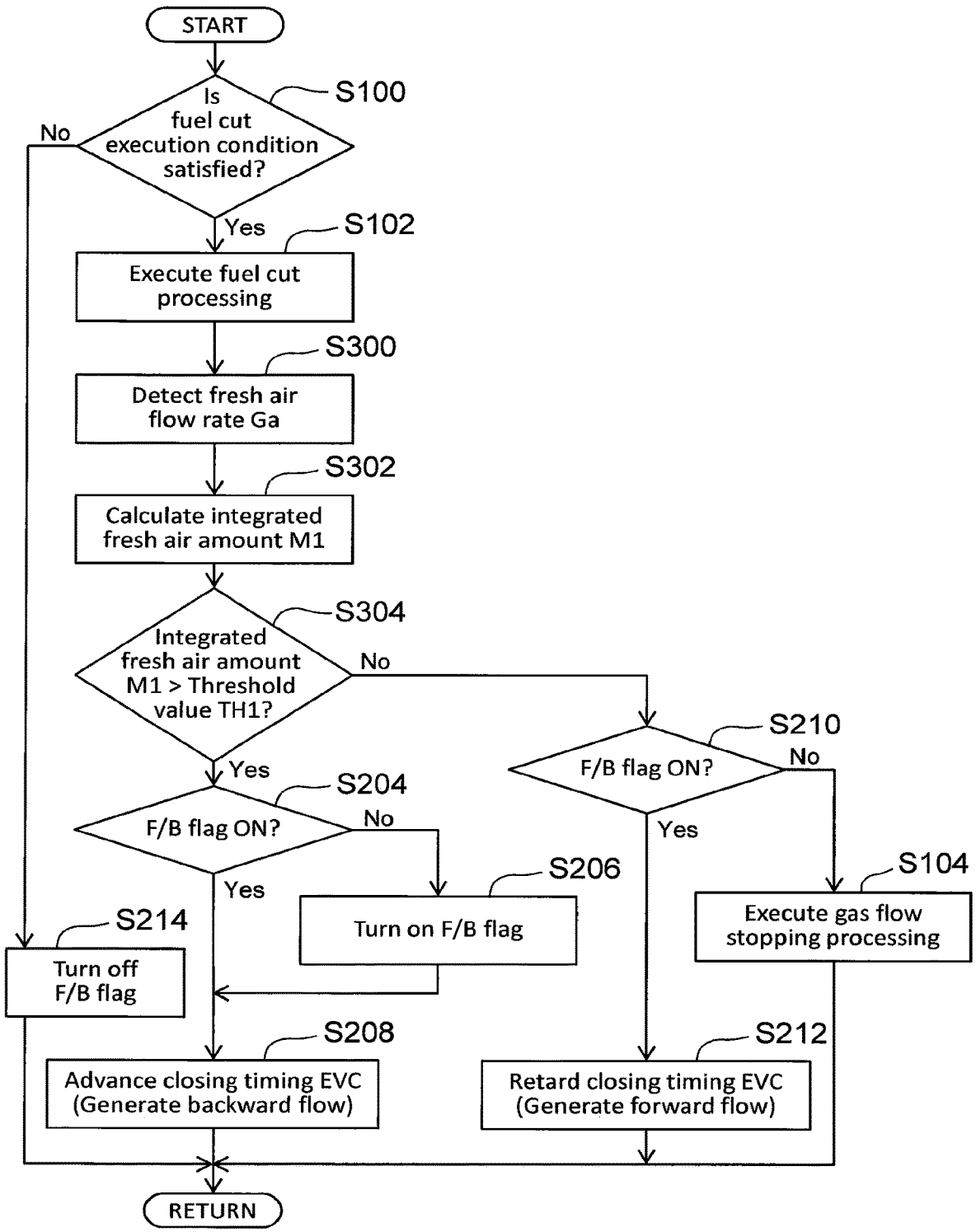
FIG. 14 is a flowchart that shows a routine of processing concerning an engine control according to a sixth embodiment of the present disclosure.

FIG. 14 is a flowchart that shows a routine of the processing concerning the engine control according to the sixth embodiment of the present disclosure. The processing of steps S100 to S104, and S204 to S214 in the routine shown in FIG. 14 is as already described in the first and fifth embodiments.

According to the routine shown in FIG. 14, after the fuel cut processing is executed in step S102, the processing proceeds to step S300. The processing of step S300 and the subsequent processing of step S302 correspond to an example of the integrated fresh air amount calculation processing described above. In step S300, the control device 60 detects the fresh air flow rate Ga using the air flow sensor 24. Thereafter, the processing proceeds to step S302.

In step S302, the control device 60 calculates the integrated fresh air amount M1 in accordance with Equation (1) described above. Thereafter, the processing proceeds to step S304. In step S304, the control device 60 determines whether or not the integrated fresh air amount M1 calculated in step S302 is greater than the threshold value TH1 described above, that is, whether or not the fresh air has reached the inlet of the catalyst 48 after the fuel cut operation is started.

If the determination result of step S304 is positive (i.e., integrated fresh air amount M1>threshold TH1), that is, if it can be estimated that the fresh air has reached the inlet of the catalyst 48, the processing proceeds to step S204. If, on the other hand, this determination result is negative (i.e., integrated fresh air amount M1≤threshold TH1), that is, if it can be estimated that the fresh air has not yet reached the inlet of the catalyst 48, the processing proceeds to step S210. Since the subsequent processing is similar to the processing of the routine shown in FIG. 12, detailed description thereof is omitted here. It should be noted that, in order to provide a predetermined dead zone for the switching between the forward flow and the backward flow based on the determination result of step S304, a hysteresis may be provided for the threshold value TH1.

6-3. Effects

Even where it is difficult to completely stop the "gas flow" only by the gas flow stopping processing due to the influence of the inertial and pulsation of the gas, the feedback processing of the present embodiment can also reduce the inflow of the fresh air into the catalyst 48 while reducing an excessive backward flow, similarly to the fifth embodiment. In addition, according to the use of the integrated fresh air amount M1, it is possible to estimate the position of arrival of the fresh air after the start of the fuel cut operation (i.e., the position of the boundary between the fresh air flowing associated with the execution of the fuel cut operation and the burned gas generated immediately before the execution of the fuel cut operation), and to appropriately perform the feedback processing on the basis of the estimation result.

6-4. Modification Examples

First, the modification examples shown in the above described sections 5-4-1, 5-4-2, and 5-4-3 may be applied to the sixth embodiment using the integrated fresh air amount M1 in the same manner as the fifth embodiment.

Furthermore, in another example of the integrated fresh air amount calculation processing, the integrated fresh air amount M1 may be calculated, for example, in the following manner using the intake pressure sensor 28, instead of the above described manner using the air flow sensor 24. FIG. 15 is a graph that shows an example of the characteristics of a map for converting the surge tank pressure detected using the intake pressure sensor 28 into the integrated fresh air amount M1. More specifically, FIG. 15 shows a relationship between the integrated fresh air amount M1 and the surge tank pressure (i.e., the pressure in a portion of the intake air passage 18 on the downstream side of the throttle valve 26).

As a premise of using the manner described above, the throttle valve 26 and the EGR valve 56 are both fully closed during the execution of the feedback processing. As a result, a portion of the intake air passage 18 located on the downstream side of the throttle valve 26 (i.e., a throttle downstream passage) can be substantially closed except when the intake valves 34 is open. This makes it possible to suitably obtain changes in surge tank pressure that the surge tank pressure decreases when the forward flow is generated by the feedback processing while the surge tank pressure increases when the backward flow is generated.

The amount of gas in the throttle downstream passage described above is proportional to the surge tank pressure. Accordingly, in the present manner, it is assumed that the amount of gas in the throttle downstream passage is proportional to an integrated value of the gas flow rate at the time of forward flow/backward flow by the feedback processing (i.e., the integrated fresh air amount MD. Then, the integrated fresh air amount M1 is obtained from the surge tank pressure by using a relationship as shown in FIG. 15.

Figure 15:
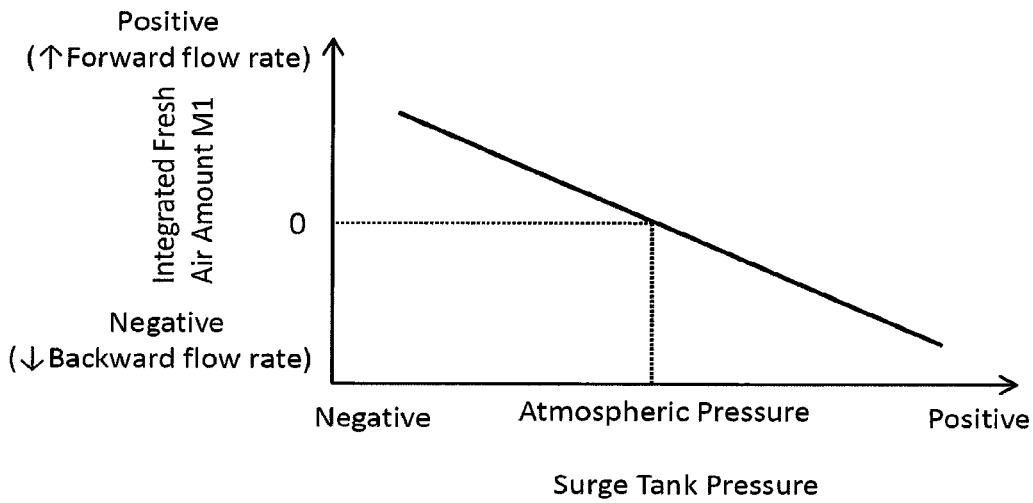
FIG. 15 is a graph that shows an example of the characteristics of a map for converting a surge tank pressure detected using an intake pressure sensor into an integrated fresh air amount M1.

In the characteristics shown in FIG. 15, the integrated fresh air amount M1 is set so as to be zero when the surge tank pressure is the atmospheric pressure. When the forward flow is generated, the surge tank pressure becomes lower in the negative pressure range when the gas flow rate is greater. On the other hand, when the backward flow is generated, the surge tank pressure becomes higher in the positive pressure range when the gas flow rate is greater. Because of this, according to the characteristics shown in FIG. 15, when the surge tank pressure is lower than the atmospheric pressure (i.e., in the negative pressure range), the integrated fresh air amount M1 is set to have a positive value and to be greater when the surge tank pressure is lower (i.e., when the surge tank pressure is higher on the negative side). Also, when the surge tank pressure is higher than the atmospheric pressure (i.e., in the positive pressure range), the integrated fresh air amount M1 is set to have a negative value and to be less (i.e., greater on the negative side) when the surge tank pressure is higher.

By storing the relationship as shown in FIG. 15 as a map, the control device 60 can calculate the integrated fresh air amount M1 using the intake pressure (surge tank pressure) detected by the intake pressure sensor 28.

7. Seventh Embodiment

Next, an internal combustion engine system according to a seventh embodiment of the present disclosure and modification examples thereof will be described with reference to FIGS. 16 to 18. This internal combustion engine system is the same as the internal combustion engine system according to the sixth embodiment described above, except for the points described below.

7-1. Outline of Processing During Fuel Cut Operation

According to the feedback processing (second feedback processing) of the sixth embodiment described above, after the integrated fresh air amount M1 becomes greater than the threshold TH1 corresponding to the amount of the fresh air contained in the volume A, the backward flow is generated. As a result, the inflow of the fresh air into the catalyst 48 can be reduced. On the other hand, as already described, returning, to an upstream portion of the intake air passage 18, of the fresh air flowing backward (more specifically, fresh air including the oil) is not favorable from the viewpoints described above, such as the reduction of the fouling of the air flow sensor 24.

Therefore, according to the present embodiment, in order to reduce the inflow of the fresh air into the catalyst 48 and also reduce the backward flow of the fresh air (including the oil) to an upstream portion of the intake air passage 18 (for example, the portion located on the upstream side of the throttle valve 26), the following processing is executed during the fuel cut operation.

Specifically, the valve driving processing according to the present embodiment includes the gas flow stopping processing and the feedback processing (second feedback processing). Furthermore, the feedback processing includes an "EGR opening processing" and a "throttle closing processing". These EGR opening processing and throttle closing processing are performed during the generation of the backward flow by the feedback processing.

Figure 16:
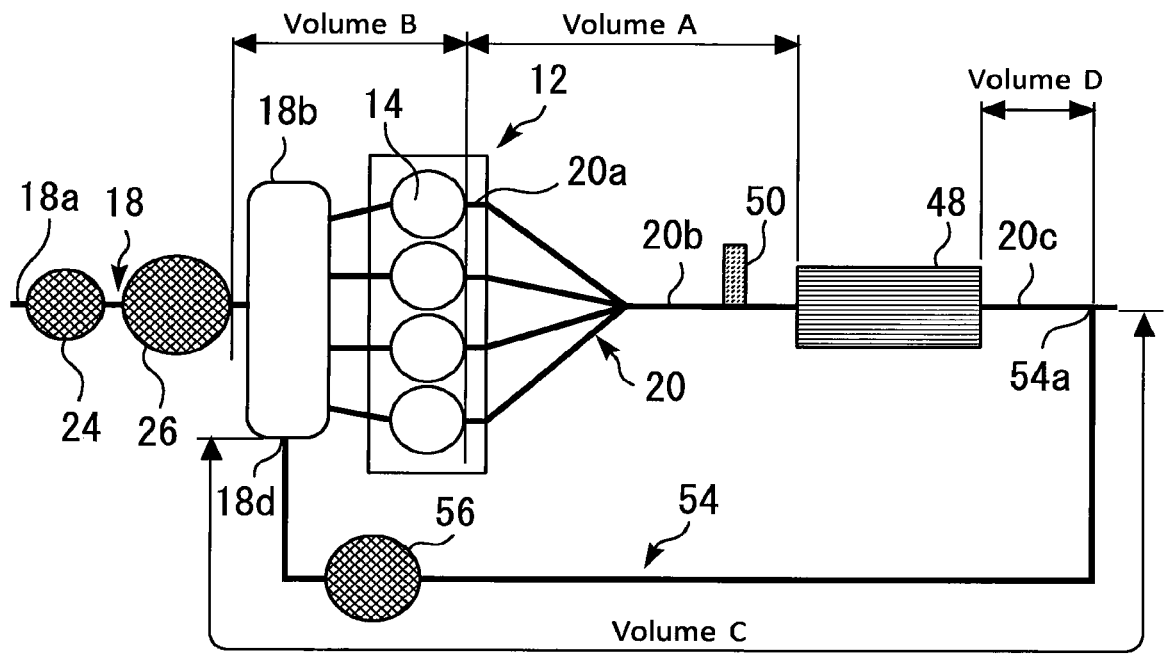
FIG. 16 is a diagram used to explain definition of passage volumes of the respective parts of an internal combustion engine.

FIG. 16 is a diagram used to explain the definition of the passage volumes of the respective parts of the internal combustion engine 12. First, the volume A corresponds to a volume of the catalyst upstream portion 20b (i.e., the portion from exhaust port to catalyst inlet) as described above. A volume B corresponds to, as an example, the sum of volumes of the combustion chambers of all the cylinders 14 and a volume of the portion of the intake air passage 18 located on the downstream side of the throttle valve 26. It should be noted that, as the volume B, any value other than the example described above can be used as long as it is a value equal to or greater than the volume of the combustion chambers.

A volume C corresponds to a volume of the EGR passage 54. A volume D corresponds to a volume of a catalyst downstream portion 20c, which is a portion of the exhaust gas passage 20 located between a connecting position 54a of the EGR passage 54 with respect to the exhaust gas passage 20 and the outlet (lower end position) of the catalyst 48.

FIGS. 17A to 17E are diagrams used to conceptually explain an example of the operation by the processing during the fuel cut operation according to the seventh embodiment of the present disclosure. FIG. 17A shows a condition of the gas flow of the respective parts of the internal combustion engine 12 immediately after the start of the fuel cut operation. In this state, the throttle valve 26 is controlled to an idling opening degree (i.e., an opening degree slightly opened with respect to a fully closed opening degree (a minimum opening degree)) as an example, and the EGR valve 56 is closed. The fresh air flows in the intake air passage 18 and the cylinders 14, and the burned gas flows in the exhaust gas passage 20.

FIG. 17B shows a condition in which the fresh air has once reached the catalyst 48 due to the response delay in the operation of the exhaust VVT 44 by the gas flow stopping processing. As already described, the fresh air that has passed through the combustion chambers and has flowed into the exhaust gas passage 20 includes the oil. Therefore, in FIGS. 17(B) to 17(D), fresh air containing this kind of oil is represented separately from the fresh air without containing the oil. In addition, hereinafter, the fresh air without containing the oil is referred to as a "fresh air F1", and the fresh air containing the oil is referred to as a "fresh air F2".

The feedback processing (second feedback processing) according to the present embodiment is executed by using the integrated fresh air amount M1 similarly to the sixth embodiment. FIG. 17C shows a condition of the gas flow immediately after the start of generation of the backward flow (integrated fresh air amount M1>threshold TH1 (which is associated with the volume A)) by this feedback processing. When this backward flow is continuously generated, part of the fresh air F2 in the exhaust gas passage 20 flows into the intake air passage 18 through the cylinders 14.

FIG. 17D shows a condition of the gas flow obtained when an integrated backward flow amount M2, which is an integrated value of amount of the backward flow of the fresh air F2 associated with the generation of the backward flow, becomes greater than the amount of the fresh air amount contained in the volume B during the generation of the backward flow by the feedback processing. In this condition, the amount of fresh air F2 returned to the intake air passage 18 by the backward flow is reached to an amount associated with the volume B. If the same processing as before is continued after this condition is reached, the fresh air F2 reaches the upstream side of the throttle valve 26.

Therefore, according to the present embodiment, the EGR valve 56 is opened by the EGR opening processing in order to prevent the fresh air F2 containing the oil from being supplied to the upstream side of the throttle valve 26. Furthermore, the throttle valve 26 disposed on the upstream side of the connecting position 18d of the EGR passage 54 with respect to the intake air passage 18 is closed by the throttle closing processing. In more detail, the throttle valve 26 is closed so as to have the fully closed opening degree (minimum opening degree) smaller than the idling opening degree.

As a result, the fresh air F2 that has flowed back to a portion of the intake air passage 18 located on the downstream side of the throttle valve 26 is released to the EGR passage 54.

FIG. 17E shows a condition of the gas flow obtained when the fresh air F2 is reached to the outlet of the catalyst 48 through the EGR passage 54 after the EGR opening processing and the throttle closing processing are performed. This condition is formed when the integrated backward flow amount M2 becomes equal to or greater than the amount of the fresh air contained in a volume corresponding to the sum of the volumes B, C and D. If, after this condition is formed, the same processing as before is continued, the fresh air F2 is supplied to the catalyst 48 from the lower end side of the catalyst 48. Therefore, when this kind of condition is formed, the control device 60 stops the second feedback processing including the EGR opening processing and the throttle closing processing.

Processing by Control Device

FIG. 18 is a flowchart that shows a routine of the processing concerning the engine control according to the seventh embodiment of the present disclosure. The processing of steps S100 to S104, S208, S300 and S302 in the routine shown in FIG. 18 are as already described in the first, fifth and sixth embodiments.

According to the routine shown in FIG. 18, after the fuel cut processing is executed in step S102, the processing of steps S300 and S302 (i.e., the integrated fresh air calculation processing) is sequentially executed. Thereafter, the processing proceeds to step S400. In step S400, the control device 60 determines whether or not the integrated fresh air amount M1 is greater than the threshold TH1 equal to the amount of the fresh air contained in the volume A. The processing of this step 400 is the same as the processing of step S304 executed when a value equal to the amount of the fresh air contained in the volume A is used as the threshold TH1 described above.

If the determination result of step S400 is negative (i.e., integrated fresh air amount M1≤threshold TH1), the gas flow stopping processing is executed (step S104). If, on the other hand, the determination result becomes positive (i.e., integrated fresh air amount M1>threshold value TH1), that is, if it can be estimated that the fresh air F2 is reached to the inlet of the catalyst 48 after the fuel cut operation is started, the processing proceeds to step S402.

In step S402, the control device 60 determines whether or not the integrated fresh air amount M1 (current value M1(k)) is greater than the last value M1(k−1). If, as a result, this determination result is negative (i.e., integrated fresh air amount M1≤last value M1(k−1)), the processing proceeds to step S406. If, on the other hand, the determination result is positive (i.e., integrated fresh air amount M1>last value M1(k−1)), the processing proceeds to step S404.

In step S404, the control device 60 executes the processing to update the value of the maximum value M1max of the integrated fresh air amount M1 with the present integrated fresh air amount M1 (i.e., current value M(k)). Thereafter, the processing proceeds to step S406.

It can be said that, if the maximum value M1max described above becomes greater than the present integrated fresh air amount M1, the backward flow of the fresh air F2 with an amount corresponding to the difference between these amounts M1max and M1 is generated. Because of this, if a value obtained by subtracting the present integrated fresh air amount M1 from the maximum value M1max is positive, this value corresponds to the integrated backward flow rate M2 described above. In step S406, the control device 60 determines whether or not the integrated backward flow amount M2 (=M1max−M1) is greater than a threshold value TH2 corresponding to the amount of the fresh air contained in the volume B.

If the determination result of step S406 is negative (i.e., integrated backward flow amount M2≤threshold TH2), that is, if it can be estimated that the fresh air F2 flowing backward has not yet reached the throttle valve 26, the processing proceeds to step S408. In step S408, the control device 60 continues the respective control states of the EGR valve 56 and the throttle valve 26 at the time of the start of the fuel cut operation. That is to say, the EGR valve 56 is kept fully closed, and the throttle valve 26 is kept at the idling opening degree. Thereafter, the processing proceeds to step S410.

In step S410, the control device 60 determines whether or not the integrated backward flow amount M2 (=M1max−M1) is equal to or less than a threshold value TH3 corresponding to the amount of the fresh air contained in the volume corresponding to the sum of the volumes B, C and D. If the processing proceeds to step S410 when the determination result of step S406 is negative (i.e., integrated backward flow amount M2≤threshold TH2), the determination result of step S410 becomes positive. As a result, the processing proceeds to step S208, and the exhaust VVT 44 is controlled such that the backward flow is generated.

If, on the other hand, the determination result of step S406 is positive (i.e., integrated backward flow amount M2>threshold value TH2), that is, if it can be estimated that the fresh air F2 flowing backward is reached to the throttle valve 26, the processing proceeds to step S412.

In step S412, the control device 60 executes the EGR opening processing and the throttle closing processing. As a result, the EGR valve 56 is opened from the fully closed opening degree, and the throttle valve 26 is closed to the fully closed opening degree (minimum opening degree). Thereafter, the processing proceeds to step S410.

If the determination result of step S410 becomes positive (i.e., integrated backward flow amount M2<threshold value TH3) when the processing proceeds from step S412 to step S410, it can be estimated that the fresh air F2 released to the EGR passage 54 has not yet reached the outlet (i.e., the lower end position) of the catalyst 48. The processing then proceeds to step S208, and the generation of the backward flow is continued.

If, on the other hand, the determination result of step S410 is negative (i.e., integrated backward flow amount M2≥threshold TH3) when the processing proceeds from step S412 to step S410, it can be estimated that the fresh air F2 released to the EGR passage 54 is reached to the outlet of the catalyst 48. The processing then proceeds to step S104, and the gas flow stopping processing is performed. This means that the feedback processing (i.e., the generation of the backward flow) including the EGR opening processing and the throttle closing processing is stopped.

7-3. Effects

As described so far, according to the engine control of the present embodiment, the EGR valve 56 is opened (EGR opening processing) after the integrated backward flow amount M2 becomes greater than the threshold TH2 (which is associated with volume B). As a result, the fresh air F2 (including the oil) that has flowed back to the intake air passage 18 after the generation of the backward flow by the feedback processing is started can be released to the EGR passage 54. Because of this, it is possible to reduce the backward flow of the fresh air F2 to the upstream side of the throttle valve 26. Therefore, the backward flow of the fresh air F2 to the upstream portion of the throttle valve 26 can be reduced (i.e., measures against the fouling of the air flow sensor 24, an increase of deposits on the wall surface of the intake air passage 18, and the prevention of the discharge of the oil into the atmosphere can be taken) while the inflow of the fresh air into the catalyst 48 is reduced by using the generation of the backward flow after the start of the fuel cut operation.

In addition, by allowing the fresh air F2 flowing back to the intake air passage 18 to be released to the EGR passage 54, the backward flow amount of the fresh air F2 can be increased to the maximum by using the volumes C and D as compared to an example in which the EGR passage 54 is not used in this manner. Therefore, even when the fresh air flows into the catalyst 48 once after the start of the fuel cut operation as in the example of the operation shown in FIG. 17B, the opportunity of eliminating or reducing the oxygen excess state of the catalyst 48 can be maximized.

It should be noted that whether or not the EGR opening processing is executed is determined on the basis of the comparison between the integrated backward flow amount M2 and the threshold value TH2 (which is associated with the volume B). Because of this, the backward flow to the upstream side of the throttle valve 26 is permitted for the fresh air F1 without containing oil until the fresh air F2 which has flowed back reaches the position of the throttle valve 26 (see FIGS. 17C and 17D).

Moreover, according to the engine control of the present embodiment, when the EGR opening processing is executed, the throttle closing processing is also executed in synchronization with the EGR opening processing. As a result, the effect of reducing the backward flow of the fresh air F2 to the upstream side of the throttle valve 26 can be enhanced as compared to an example in which the EGR opening processing is executed while the throttle valve 26 is opened at the idling opening degree.

Furthermore, according to the engine control of the present embodiment, the feedback processing (i.e., the generation of the backward flow) associated with the EGR opening processing and the throttle closing processing is stopped after the integrated backward flow amount M2 becomes greater than the threshold TH3 (which is associated with the volume B+C+D). As a result, it is possible to appropriately determine the stop timing of the generation of the backward flow such that the backward flow amount of the fresh air F2 can be maximized while preventing the fresh air F2 that has been released into the EGR passage 54 from flowing into the catalyst 48 from the outlet side of the catalyst 48.

7-4. Modification Examples

In the seventh embodiment described above, when the EGR opening processing is executed, the throttle closing processing is also executed in synchronization with the EGR opening processing. However, even if the EGR opening processing is executed without the throttle closing processing being executed, at least part of the fresh air F2 is released to the EGR passage 54, and the effect of reducing the inflow of the fresh air F2 to the upstream side of the throttle valve 26 is thus obtained. Because of this, the EGR opening processing may be executed independently without the throttle closing processing. In addition, the EGR opening processing may be executed in a system of an internal combustion engine that does not include a throttle valve at a portion of an intake air passage located on the upstream side of a connecting position of an EGR passage to the intake air passage.

8. Another Configuration Example of Internal Combustion Engine

In the first to seventh embodiments described above, the internal combustion engine 12 including both of the intake VVT 36 configured to change the closing timing IVC and the exhaust VVT 44 configured to change the closing timing EVC has been exemplified. However, the internal combustion engine applied to the internal combustion engine system according to the present disclosure may include a variable valve operating device configured to change only one of the intake valve closing timing and the exhaust valve closing timing.

The embodiments and modification examples described above may be combined in other ways than those explicitly described above as required and may be modified in various ways without departing from the scope of the present disclosure.

What is claimed is:

1. An internal combustion engine system, comprising:
   an internal combustion engine including a crankshaft, an exhaust gas purifying catalyst arranged in an exhaust gas passage, a fuel injection valve configured to inject fuel in an intake port of an intake air passage or in a cylinder, and a variable valve operating device configured to change at least one of an intake valve closing timing and an exhaust valve closing timing; and
   a control device configured to control the internal combustion engine,
   wherein, where: a difference of the intake valve closing timing with respect to a compression top dead center is referred to as a first crank angle difference; a difference of the exhaust valve closing timing with respect to an exhaust top dead center is referred to as a second crank angle difference; and a difference between the first crank angle difference and the second crank angle difference is referred to as an intake/exhaust closing timing difference, the control device is configured to execute:
   a fuel cut processing that controls the fuel injection valve to stop fuel injection during rotation of the crank shaft; and
   a valve driving processing that controls the variable valve operating device to control at least one of the intake valve closing timing and the exhaust valve closing timing such that the intake/exhaust closing timing difference becomes smaller during a fuel cut operation in which the fuel cut processing is in execution than during a non-fuel cut operation.

2. The internal combustion engine system according to claim 1,
   wherein the valve driving processing includes a gas flow stopping processing that controls the variable valve operating device to control at least one of the intake valve closing timing and the exhaust valve closing timing such that the intake/exhaust closing timing difference approaches zero.

3. The internal combustion engine system according to claim 2,
   wherein, in the gas flow stopping processing, the control device is configured to change the intake/exhaust closing timing difference, in accordance with engine speed, within a designated crank angle range centered on a basic value at which the intake/exhaust closing timing difference is zero.

4. The internal combustion engine system according to claim 2,
   wherein the variable valve operating device is configured to change only the intake valve closing timing among the intake valve closing timing and the exhaust valve closing timing, and
   wherein, in the gas flow stopping processing, the control device is configured to retard the intake valve closing timing to cause the intake/exhaust closing timing difference to approach zero.

5. The internal combustion engine system according to claim 2,
   wherein the variable valve operating device is configured to change only the exhaust valve closing timing among the intake valve closing timing and the exhaust valve closing timing, and
   wherein, in the gas flow stopping processing, the control device is configured to advance the exhaust valve closing timing to cause the intake/exhaust closing timing difference to approach zero.

6. The internal combustion engine system according to claim 1,
   wherein the internal combustion engine further includes an air fuel ratio sensor arranged in a portion of the exhaust gas passage located on an upstream side of the exhaust gas purifying catalyst,
   wherein the valve driving processing includes a first feedback processing, and
   wherein, in the first feedback processing, the control device is configured, where an actual air fuel ratio detected by the air fuel ratio sensor is higher than an air fuel ratio threshold value higher than a target air fuel ratio at an engine operating condition immediately before a start of the fuel cut processing, to control at least one of the intake valve closing timing and the exhaust valve closing timing such that a backward flow being a flow of gas from the exhaust gas passage toward the intake air passage through the cylinder is generated or such that a flow rate of a forward flow being a flow of fresh air from the intake air passage toward the exhaust gas passage through the cylinder decreases.

7. The internal combustion engine system according to claim 6,
   wherein, in the first feedback processing, the control device is configured, where the actual air fuel ratio is equal to or lower than the air fuel ratio threshold value, to control at least one of the intake valve closing timing and the exhaust valve closing timing such that the backward flow is stopped or the forward flow is generated.

8. The internal combustion engine system according to claim 1,
   wherein the valve driving processing includes a second feedback processing,
   wherein the internal combustion engine includes at least one of an air flow sensor and an intake pressure sensor,
   wherein the second feedback processing includes an integrated fresh air amount calculation processing to calculate, based on an output of the air flow sensor or the intake pressure sensor, an integrated fresh air amount being an integrated value of fresh air from the intake air passage toward the exhaust gas passage through the cylinder after the fuel cut processing starts, and
   wherein, in the second feedback processing, the control device is configured, where the integrated fresh air amount is greater than a fresh air amount threshold value equal to or less than a volume A of a catalyst upstream portion being a portion of the exhaust gas passage located on an upstream side of the exhaust gas purifying catalyst, to control at least one of the intake valve closing timing and the exhaust valve closing timing such that a backward flow being a flow of gas from the exhaust gas passage toward the intake air passage through the cylinder is generated or such that a flow rate of a forward flow being a flow of fresh air from the intake air passage toward the exhaust gas passage through the cylinder decreases.

9. The internal combustion engine system according to claim 8,
   wherein, in the second feedback processing, the control device is configured, where the integrated fresh air amount is equal to or less than the fresh air amount threshold value, to control at least one of the intake valve closing timing and the exhaust valve closing timing such that the backward flow is stopped or the forward flow is generated.

10. The internal combustion engine system according to claim 8,
wherein the internal combustion engine further includes an EGR device,
wherein the EGR device includes an EGR passage configured to connect a portion of the exhaust gas passage located on a downstream side of the exhaust gas purifying catalyst with the intake air passage, and an EGR valve configured to open and close the EGR passage,
wherein the second feedback processing includes an EGR opening processing executed during generation of the backward flow by the second feedback processing, and
wherein, in the EGR opening processing, the control device is configured, after an integrated backward flow amount being an integrated value of a backward flow amount of fresh air in generating the backward flow by the second feedback processing becomes higher than an amount of fresh air contained in a volume B equal to or greater than a combustion chamber volume in the cylinder, to open the EGR valve.

11. The internal combustion engine system according to claim 10,
wherein the internal combustion engine further includes a throttle valve arranged in a portion of the intake air passage located on an upstream side of a connecting position of the EGR passage with respect to the intake air passage, and
wherein the second feedback processing includes a throttle closing processing that closes the throttle valve after the integrated backward flow amount becomes greater than the amount of fresh air contained in the volume B.

12. The internal combustion engine system according to claim 11,
wherein, where a volume of the EGR passage is referred to as a volume C and a volume of a catalyst downstream portion of the exhaust gas passage located between a connecting position of the EGR passage with respect to the exhaust gas passage and an outlet of the exhaust gas purifying catalyst is referred to as a volume D, the control device is configured, after the integrated backward flow amount becomes equal to or greater than an amount of fresh air contained in a volume equivalent to a sum of the volume B, the volume C and the volume D.

* * * * *